(12) United States Patent
Brown

(10) Patent No.: US 8,447,563 B2
(45) Date of Patent: May 21, 2013

(54) METHOD AND SYSTEM FOR DETERMINATION OF DETECTION PROBABILITY OR A TARGET OBJECT BASED ON A RANGE

(75) Inventor: Jerry G. Brown, Bloomington, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 390 days.

(21) Appl. No.: 12/414,769

(22) Filed: Mar. 31, 2009

(65) Prior Publication Data

US 2010/0250189 A1    Sep. 30, 2010

(51) Int. Cl.
*G06F 17/18* (2006.01)

(52) U.S. Cl.
USPC ............. 702/181; 702/97; 702/159; 702/182; 356/3; 715/700

(58) Field of Classification Search
USPC ............... 702/94, 95, 97, 134, 155, 158, 159, 702/172, 181, 182; 356/3; 715/700
See application file for complete search history.

(56) References Cited

U.S. PATENT DOCUMENTS

| | | | |
|---|---|---|---|
| 4,600,305 A | 7/1986 | Priddy | |
| 5,282,014 A * | 1/1994 | Ruhl et al. | 356/4.02 |
| 5,623,335 A | 4/1997 | Bamberger | |
| 5,898,484 A | 4/1999 | Harris | |
| 6,445,444 B2 | 9/2002 | Dunne | |
| 6,711,352 B2 | 3/2004 | Kohno et al. | |
| 6,934,012 B2 | 8/2005 | Inaba et al. | |
| 7,215,430 B2 | 5/2007 | Kacyra et al. | |
| 7,414,707 B2 | 8/2008 | LaBelle et al. | |
| 8,004,660 B2 * | 8/2011 | Brown | 356/5.02 |
| 2004/0046953 A1 | 3/2004 | Nagata et al. | |
| 2005/0099637 A1* | 5/2005 | Kacyra et al. | 356/601 |
| 2007/0194170 A1* | 8/2007 | Ellison et al. | 244/3.1 |
| 2008/0018890 A1 | 1/2008 | Maity et al. | |
| 2008/0290164 A1 | 11/2008 | Papale et al. | |
| 2009/0310130 A1* | 12/2009 | Norman | 356/301 |
| 2010/0008539 A1 | 1/2010 | Johnson | |
| 2010/0250188 A1* | 9/2010 | Brown | 702/181 |

FOREIGN PATENT DOCUMENTS

| | | |
|---|---|---|
| JP | 09-068414 | 3/1997 |
| RU | 2 247 321 | 1/2005 |

OTHER PUBLICATIONS

Juyal et al., "Design of a High Performance Laser Range Finder," Jul. 2001, pp. I-146-I-147, Instruments Research and Development Establishment, Deharadum, India.

(Continued)

*Primary Examiner* — Alexander H Taningco
*Assistant Examiner* — Paul D Lee
(74) *Attorney, Agent, or Firm* — Christopher A. Monsey

(57) ABSTRACT

A simulation system for predicting a likelihood of whether a target object positioned in an environment will be detected by a detection system when illuminated by a laser source. The simulation system may be used for a laser rangefinder application and a laser designator application. The simulation system may provide a detection probability of the target object at a specified range to the detection system or a plurality of detection probabilities as a function of the range to the detection system. The simulation system may provide an indication of an overlap of the beam provided by the laser source on the target object. The simulation system may determine the effect of vibration on the detection of the target object at a specified range.

10 Claims, 26 Drawing Sheets

OTHER PUBLICATIONS

Clair L. Wyatt, Radiometric System Design, 1987, p. 49-58, Macmillan Publishing Company, New York, New York.

Clifton S. Fox, Active Electro-Optical Systems, The Infrared and Electro-Optical Systems Handbook, 1996, p. 52-57, SPIE and the Environmental Research Institute of Michigan.

Electro-Optics Handbook, 1974, p. 109-114, RCA Corporation, Lancaster, Pennsylvania.

Joint Pub 3-09.1, Jun. 1, 1991, p. II-1-II-6, Joint Laser Designation Procedures, Washington, D.C.

Joint Laser Designation Procedures Training and Doctrine Command Procedures Pamphlet 34-3, Dec. 11, 1985.

Robert W. Boyd, Radiometry and the Detection of Optical Radiation, May 1983, p. 13-25, John Wiley & Sons, Inc, USA.

* cited by examiner

METHOD AND SYSTEM FOR DETERMINATION OF DETECTION PROBABILITY OR A TARGET OBJECT BASED ON A RANGE

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon.

RELATED APPLICATIONS

The present application, titled METHOD AND SYSTEM FOR DETERMINATION OF DETECTION PROBABILITY OF A TARGET OBJECT BASED ON A RANGE, is filed concurrently with the following three related applications: U.S. patent application Ser. No. 12/414,764, titled USER INTERFACE FOR LASER TARGETING SYSTEM, U.S. patent application Ser. No. 12/414,717, titled LASER TARGETING SYSTEM, and U.S. patent application Ser. No. 12/414,769, titled METHOD AND SYSTEM FOR DETERMINATION OF DETECTION PROBABILITY OF A TARGET OBJECT BASED ON A RANGE, the disclosures each of which are expressly incorporated by reference herein.

BACKGROUND OF THE INVENTION

The present invention relates generally to devices for quantifying laser targeting systems, such as laser range finder systems and laser designator systems, and, more particularly, to devices for determining the likelihood of success of a laser targeting system for a given application and the likelihood of detection of a target object with the laser targeting system as a function of range to the target object.

Laser rangefinders are devices which send out a pulsed optical signal with a source. The signal propagates through an environment and reflects off of a target object. The reflected energy, if of sufficient strength, is sensed by a sensing unit of the laser rangefinder. As is known, based on the time difference between the occurrence of sending out the optical signal and sensing the optical signal a range to the target object may be determined.

Laser designators are devices that use a pulse coding system to illuminate a target with a pulsed laser beam having a given code. A tracking device detects laser radiation reflected from the target and verifies the target based on the code contained in the reflected laser radiation. The tracking device then moves to the location of the target to interface with the target. Of course, the target may be a moving target.

Many factors influence whether a laser rangefinder or a laser designator is able to sense a reflected signal from a target object and thus determine a range to the target object or to detect the target object. First, the characteristics of the optical source illuminating the target object including power, beam divergence, and other factors. Second, the characteristics of the environment through which the optical signal passes. Third, the characteristics of the target object itself. Fourth, the characteristics of the sensor system. Fifth, the distance or range to the target object.

The effect of these characteristics may be calculated based on known optical equations. However, the effectiveness of a system on detecting a target object as a function of range or the probability of detecting a target at a given range are difficult to determine. Traditionally, many calculations were performed by a technician to determine the effectiveness of a given system of detecting a target at a given range. Once completed, if any of the above-mentioned characteristics are changed the calculations were performed over again.

SUMMARY OF THE INVENTION

In an exemplary embodiment of the present disclosure, a method for evaluating a target locator system for a mission is provided. Exemplary target locators include laser rangefinder systems, laser designators systems, active or passive remote sensing or surveillance systems for detecting object positions, communication systems, and other suitable systems wherein a laser source is propagated through an environment towards a detector. The method comprising providing a library of laser sources in a memory accessible by the computing system, each of the laser sources in the library of laser sources being capable of providing radiation for illuminating a target object; receiving a selection of a first laser source from the library of laser sources, the first laser source having associated source characteristics; receiving target characteristics of the target object; receiving environment characteristics of an environment surrounding the target object; receiving detection system characteristics of a detection system for detecting the target object; and determining a likelihood of detecting the target object with the detection system when the target object is illuminated by the first laser source. In an example, a computer readable medium includes software for performing the above mentioned method.

In a further embodiment of the present disclosure, a system for evaluating a target locator system for a mission is provided. Exemplary target locators include laser rangefinder systems, laser designators systems, active or passive remote sensing or surveillance systems for detecting object positions, communication systems, and other suitable systems wherein a laser source is propagated through an environment towards a detector. The system comprising a display; at least one user input device; a controller operatively coupled to the display and the at least one input device; a memory accessible by the controller; and laser targeting software stored on the memory for execution by the controller. The laser targeting software including a library of laser sources. Each of the laser sources in the library of laser sources being capable of providing radiation for illuminating a target object. The laser targeting software further including software for determining a likelihood of detecting a target object with a detection system when the target object is illuminated by a first laser source of the library of laser sources, the first laser source being selected through the at least one user input along with target characteristics of the target object, environment characteristics of an environment surrounding the target object, and detection system characteristics of the detection system.

In another exemplary embodiment of the present disclosure, a method for evaluating a target locator system for a mission is provided. Exemplary target locators include laser rangefinder systems, laser designators systems, active or passive remote sensing or surveillance systems for detecting object positions, communication systems, and other suitable systems wherein a laser source is propagated through an environment towards a detector. The method comprising providing a library of detection systems in a memory accessible by the computing system, each of the detection systems in the library of detection systems being capable of receiving radiation from a target object; receiving a selection of a first detection system from the library of detection systems, the first detection system having associated detection system characteristics; receiving target characteristics of the target object; receiving environment characteristics of an environment surrounding the target object; receiving laser source characteristics of a laser source for illuminating the target object; and determining a likelihood of detecting the target object with the first detection system when the target object is illuminated by the laser source. In an example, a computer readable medium includes software for performing the above mentioned method.

In yet a further embodiment of the present disclosure, a system for evaluating a target locator system for a mission is provided. Exemplary target locators include laser rangefinder systems, laser designators systems, active or passive remote sensing or surveillance systems for detecting object positions, communication systems, and other suitable systems wherein a laser source is propagated through an environment towards a detector. The system comprising a display; at least one user input device; a controller operatively coupled to the display and the at least one input device; a memory accessible by the controller; and laser targeting software stored on the memory for execution by the controller. The laser targeting software including a library of detection systems. Each of the detection systems in the library of detection systems being capable of receiving radiation from a target object. The laser targeting software further including software for determining a likelihood of detecting a target object with a first detection system of the library of detection systems when the target object is illuminated by a laser source, the first detection system being selected through the at least one user input along with target characteristics of the target object, environment characteristics of an environment surrounding the target object, and laser source characteristics of the laser source.

In yet another exemplary embodiment of the present disclosure, a method for evaluating a target locator system for a mission is provided. Exemplary target locators include laser rangefinder systems, laser designators systems, active or passive remote sensing or surveillance systems for detecting object positions, communication systems, and other suitable systems wherein a laser source is propagated through an environment towards a detector. The method comprising receiving laser source characteristics of a laser source; providing a library of target objects in a memory accessible by the computing system, each of the target objects in the library of target objects being capable of reflecting radiation from the laser source; receiving a selection of a first target object from the library of target objects, the first target object having associated target object characteristics; receiving environment characteristics of an environment surrounding the first target object; receiving detection system characteristics of a detection system for detecting the first target object; and determining a likelihood of detecting the first target object with the detection system when the first target object is illuminated by the laser source.

In still a further embodiment of the present disclosure, a system for evaluating a target locator system for a mission is provided. Exemplary target locators include laser rangefinder systems, laser designators systems, active or passive remote sensing or surveillance systems for detecting object positions, communication systems, and other suitable systems wherein a laser source is propagated through an environment towards a detector. The system comprising a display; at least one user input device; a controller operatively coupled to the display and the at least one input device; a memory accessible by the controller; and laser targeting software stored on the memory for execution by the controller. The laser targeting software including a graphical user interface presented on the display. The graphical user interface including a first portion presenting at least one input having a plurality of selectable values for at least one source characteristic of a laser source; a second portion presenting at least one input for at least one detector characteristic of a detection system; a third portion presenting at least one input having a plurality of selectable values for at least one target characteristic of a target object; a fourth portion presenting at least one input having a plurality of selectable values for at least one environment characteristic of an environment surrounding the target object; and a fifth portion presenting at least one input for a range of at least one of from the laser source to the target object and from the target object to the detection system. The laser targeting software further including processing sequences to determine an amount of energy emitted by the laser source that is received by detection system subsequent to an interaction with the target object, wherein at least one of the at least one source characteristic, the at least one detector characteristic, the at least one target characteristic, the at least one environment characteristic, and the range is adjustable through the graphical user interface.

In still another embodiment of the present disclosure, a system for evaluating a target locator system for a mission is provided. Exemplary target locators include laser rangefinder systems, laser designators systems, active or passive remote sensing or surveillance systems for detecting object positions, communication systems, and other suitable systems wherein a laser source is propagated through an environment towards a detector. The system comprising a display; at least one user input device; a controller operatively coupled to the display and the at least one input device; a memory accessible by the controller; and laser targeting software stored on the memory for execution by the controller. The laser targeting software including a graphical user interface presented on the display, the graphical user interface including a first portion presenting at least one input for at least one source characteristic of a laser source; a second portion presenting at least one input for at least one detector characteristic of a detection system; a third portion presenting at least one input for at least one target characteristic of a target object; and a fourth portion presenting at least one input for at least one environment characteristic of an environment surrounding the target object. The laser targeting software further including processing sequences to determine a probability of detection of the target object illuminated by the laser source with the detection system over a plurality of ranges from the target object to the detection system, the probability of detection being based on the at least one source characteristic, the at least one detector characteristic, the at least one target characteristic, and the at least one environment characteristic.

In yet still a further exemplary embodiment of the present disclosure, a system for evaluating a target locator system is provided. Exemplary target locators include laser rangefinder systems, laser designators systems, active or passive remote sensing or surveillance systems for detecting object positions, communication systems, and other suitable systems wherein a laser source is propagated through an environment towards a detector. The system comprising a display; at least one user input device; a controller operatively coupled to the display and the at least one input device; a memory accessible by the controller; and laser targeting software stored on the memory for execution by the controller. The laser targeting software including a graphical user interface presented on the display, the graphical user interface including a first portion presenting at least one input for at least one source characteristic of a laser source; a second portion presenting at least one input for at least one detector characteristic of a detection system; a third portion presenting at least one input for at least one target characteristic of a target object; a fourth portion presenting at least one input for at least one environment characteristic of an environment surrounding the target object; and a fifth portion presenting at least one input for at least one target locator system vibration characteristic. The laser targeting software further including processing sequences to determine an effect of vibration of the target locator system on a detection of the target object illuminated by the laser source with the detection system, the effect of vibration being based on the at least one source characteristic, the at least one detector characteristic, the at least one target characteristic, the at least one environment characteristic, and the at least one target locator system vibration characteristic.

In a further exemplary embodiment of the present disclosure, a system for evaluating a target locator system for a mission is provided. Exemplary target locators include laser rangefinder systems, laser designators systems, active or passive remote sensing or surveillance systems for detecting object positions, communication systems, and other suitable systems wherein a laser source is propagated through an environment towards a detector. The system comprising: a display; at least one user input device; a controller operatively coupled to the display and the at least one input device; a memory accessible by the controller; and laser targeting software stored on the memory for execution by the controller. The laser targeting software including a library of target objects. Each of the target objects in the library of target objects having associated reflectivity characteristics. The laser targeting software further including software for determining a likelihood of detecting a first target object of the library of target objects with a detection system when the target object is illuminated by a laser source of the library of laser sources. The first target object being selected through the at least one user input along with laser source characteristics of the laser source, environment characteristics of an environment surrounding the first target object, and detection system characteristics of the detection system.

In yet a further exemplary embodiment of the present disclosure, a method for evaluating a target locator system is provided. Exemplary target locators include laser rangefinder systems, laser designators systems, active or passive remote sensing or surveillance systems for detecting object positions, communication systems, and other suitable systems wherein a laser source is propagated through an environment towards a detector. The method comprising the steps of: presenting through a first portion of a graphical user interface presented on a display at least one input having a plurality of selectable values for at least one source characteristic of a laser source; receiving through the first portion of the graphical user interface a selection of a first one of the plurality of selectable values for the at least one source characteristic of a laser source; presenting through a second portion of the graphical user interface presented on the display at least one input for at least one detector characteristic of a detection system; receiving through the second portion of the graphical user interface a first input for the at least one detector characteristic of the detection system; presenting through a third portion of the graphical user interface presented on the display at least one input having a plurality of selectable values for at least one target characteristic of a target object; receiving through the third portion of the graphical user interface a selection of a first one of the plurality of selectable values for the at least one target characteristic of a target object; presenting through a fourth portion of the graphical user interface presented on the display at least one input having a plurality of selectable values for at least one environment characteristic of an environment surrounding the target object; receiving through the fourth portion of the graphical user interface a selection of a first one of the plurality of selectable values for the at least one environment characteristic of the environment; presenting through a fifth portion at least one input for a range of at least one of from the laser source to the target object and from the target object to the detection system; receiving through the fifth portion a first input for the range of the at least one of from the laser source to the target object and from the target object to the detection system; and determining an amount of energy emitted by the laser source that is received by the detection system subsequent to an interaction with the target object.

In yet still a further exemplary embodiment, a target locator system is provided. Exemplary target locators include laser rangefinder systems, laser designators systems, active or passive remote sensing or surveillance systems for detecting object positions, communication systems, and other suitable systems wherein a laser source is propagated through an environment towards a detector. The target locator system comprising: a laser source; a power source operatively coupled to the laser source to power the laser source; a controller operatively coupled to the power source to control a power level of the laser source; a memory accessible by the controller; and a laser targeting software stored on the memory for execution by the controller. The laser targeting software including a graphical user interface presented on the display. The graphical user interface including: a first portion presenting at least one input for at least one detector characteristic of a detection system; a second portion presenting at least one input for at least one target characteristic of a target object; a third portion presenting at least one input for at least one environment characteristic of an environment surrounding the target object; and a fourth portion presenting at least one input corresponding to a range relative to the target object. The laser targeting software including processing sequences to determine a probability of detection of the target object illuminated by the laser source at a first power level with the detection system at a specified range input with the fourth portion. The controller adjusts the power level of the laser source based on the probability of detection being below a threshold value.

In still another exemplary embodiment of the present disclosure, a method of operating a target locator system having a laser source is provided. Exemplary target locators include laser rangefinder systems, laser designators systems, active or passive remote sensing or surveillance systems for detecting object positions, communication systems, and other suitable systems wherein a laser source is propagated through an environment towards a detector. The method comprising the steps of: receiving at least one target characteristic of a target object which is to be illuminated by laser energy from the laser source; receiving at least one detector characteristic of a detector of a detection system which is to be detecting the laser energy from the laser source reflected by the target object; receiving at least one environment characteristic of an environment surrounding the target object; receiving a first range relative to the target object; and automatically determining with a computer processor based on the at least one target characteristic, the at least one detector characteristic, the at least one environment characteristic, and the first range a probability of detection of the target object illuminated by the laser source at a first power level with the detection system at the first range.

In yet another exemplary embodiment of the present disclosure, a method of operating a target locator system is provided. Exemplary target locators include laser rangefinder systems, laser designators systems, active or passive remote sensing or surveillance systems for detecting object positions, communication systems, and other suitable systems wherein a laser source is propagated through an environment towards a detector. The method comprising the steps of: receiving at least one laser characteristic of a laser source; receiving at least one target characteristic of a target object which is to be illuminated by laser energy from the laser source; receiving at least one detector characteristic of a detector of a detection system which is to be detecting the laser energy from the laser source reflected by the target object; receiving at least one environment characteristic of an environment surrounding the target object; receiving a first range relative to the target object; receiving at least one vibration characteristic of the target locator system; and automatically determining with a computer processor based on the at least one laser source characteristic; the at least one target characteristic, the at least one detector characteristic, the at least one environment characteristic, the first range, and the at least one vibration characteristic a probability of detection of the target object illuminated by the laser source with the detection system at the first range.

BRIEF DESCRIPTION OF THE DRAWINGS

The foregoing aspects and many of the attendant advantages of this invention will become more readily appreciated as the same become better understood by reference to the following detailed description when taken in conjunction with the accompanying drawings.

Figure 1:
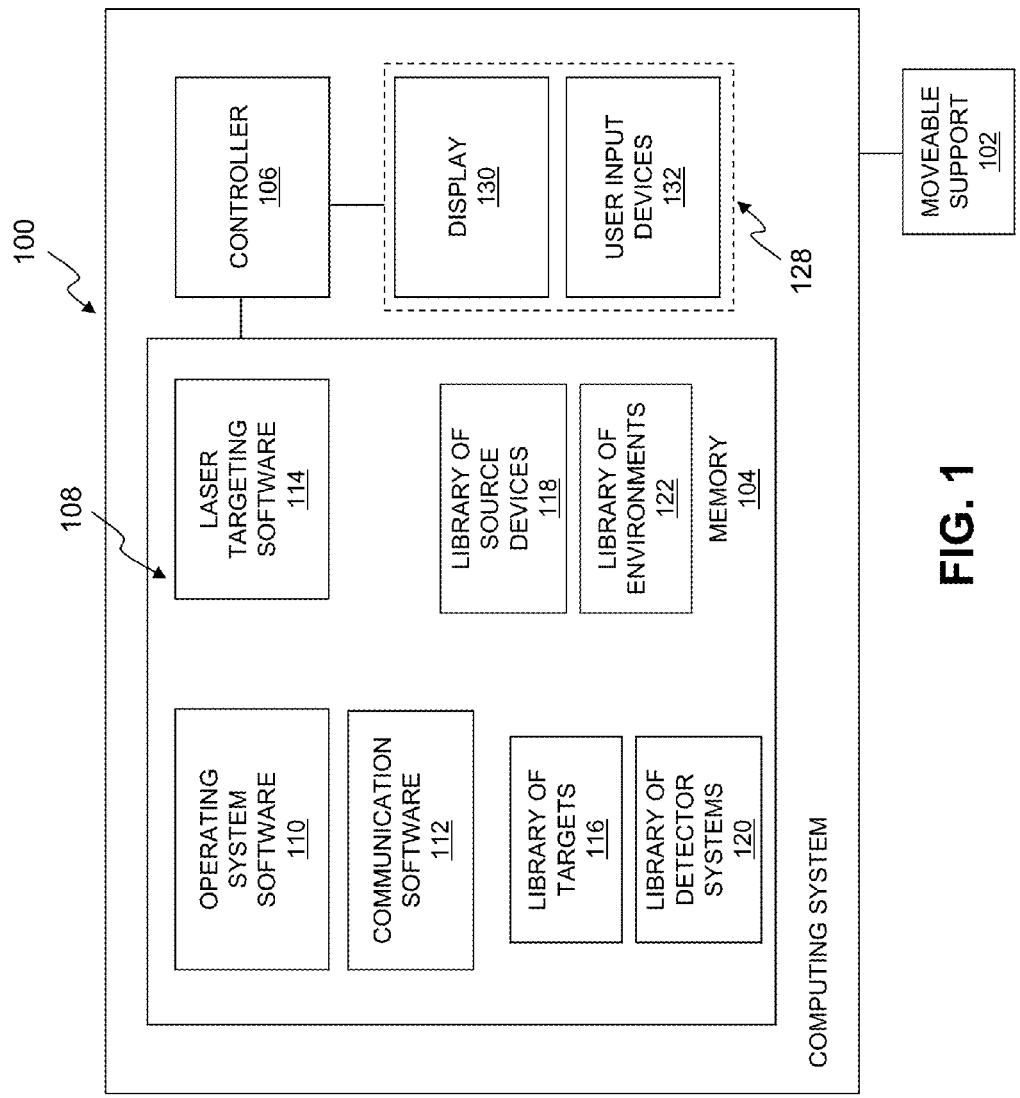
FIG. 1 is a representative view of an exemplary computing system including laser targeting software.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates embodiments of the invention, and such exemplifications are not to be construed as limiting the scope of the invention in any manner.

DETAILED DESCRIPTION OF THE DRAWINGS

For the purposes of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrated devices and described methods and further applications of the principles of the invention which would normally occur to one skilled in the art to which the invention relates.

Referring to FIG. 1, a computing system 100 is shown. Computing system 100 may be a general purpose computer, a portable computing device, or a computing device coupled to or integrated with a moveable support 102. In one embodiment, computing system 100 is a stand alone computing device. Exemplary stand alone computing devices include a general purpose computer, such as a desktop computer, a laptop computer, and a tablet computer. In one embodiment, computing system 100 is a computing system associated with a moveable support 102. Exemplary moveable supports include powered vehicles, such as cars, trucks, boats, aircraft, and other types of moveable supports. Although the computing system 100 is coupled to a moveable support 102, the moveable support may be either stationary or moving during use of the software described herein. In this embodiment, computing system 100 may be a part of moveable support 102 or may be a stand alone computing device which is capable of communicating with moveable support 102. Although computing system 100 is illustrated as a single computing system, it should be understood that multiple computing systems may be used together, such as over a network or other methods of transferring data.

Computing system 100 has access to a memory 104 which is accessible by a controller 106 of computing system 100. Exemplary controllers include computer processors. Controller 106 executes software 108 stored on the memory 104. Memory 104 is a computer readable medium and may be a single storage device or may include multiple storage devices, located either locally with computing system 100 or accessible across a network. Computer-readable media may be any available media that may be accessed by controller 106 of computing system 100 and includes both volatile and non-volatile media. Further, computer readable-media may be one or both of removable and non-removable media. By way of example, computer-readable media may include, but is not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other medium which may be used to store the desired information and which may be accessed by computing system 100.

Memory 104 includes operating system software 110. An exemplary operating system software is a WINDOWS operating system available from Microsoft Corporation of Redmond, Wash. Memory 104 further includes communications software 112, if computing system 100 has access to a network, such as a local area network, a public switched network, a CAN network, any type of wired network, and any type of wireless network. An exemplary public switched network is the Internet. Exemplary communications software 112 includes e-mail software, internet browser software, and other types of software which permit computing system 100 to communicate with other devices across a network.

Memory 104 further includes laser targeting software 114. Although described as software, it is understood that at least portions of the laser targeting software 114 may be implemented as hardware. As explained herein, laser targeting software 114 based on a plurality of inputs determines a likelihood of a detector accurately detecting a target object. Also, as explained herein laser targeting software 114 may reference one or more of a library of target objects 116, a library of laser sources 118, a library of detector systems 120, and a library of environments 122. In each of these libraries, characteristics of actual physical objects are provided. In one embodiment, the characteristics are representative of a physical object that represents a group.

Figure 2:
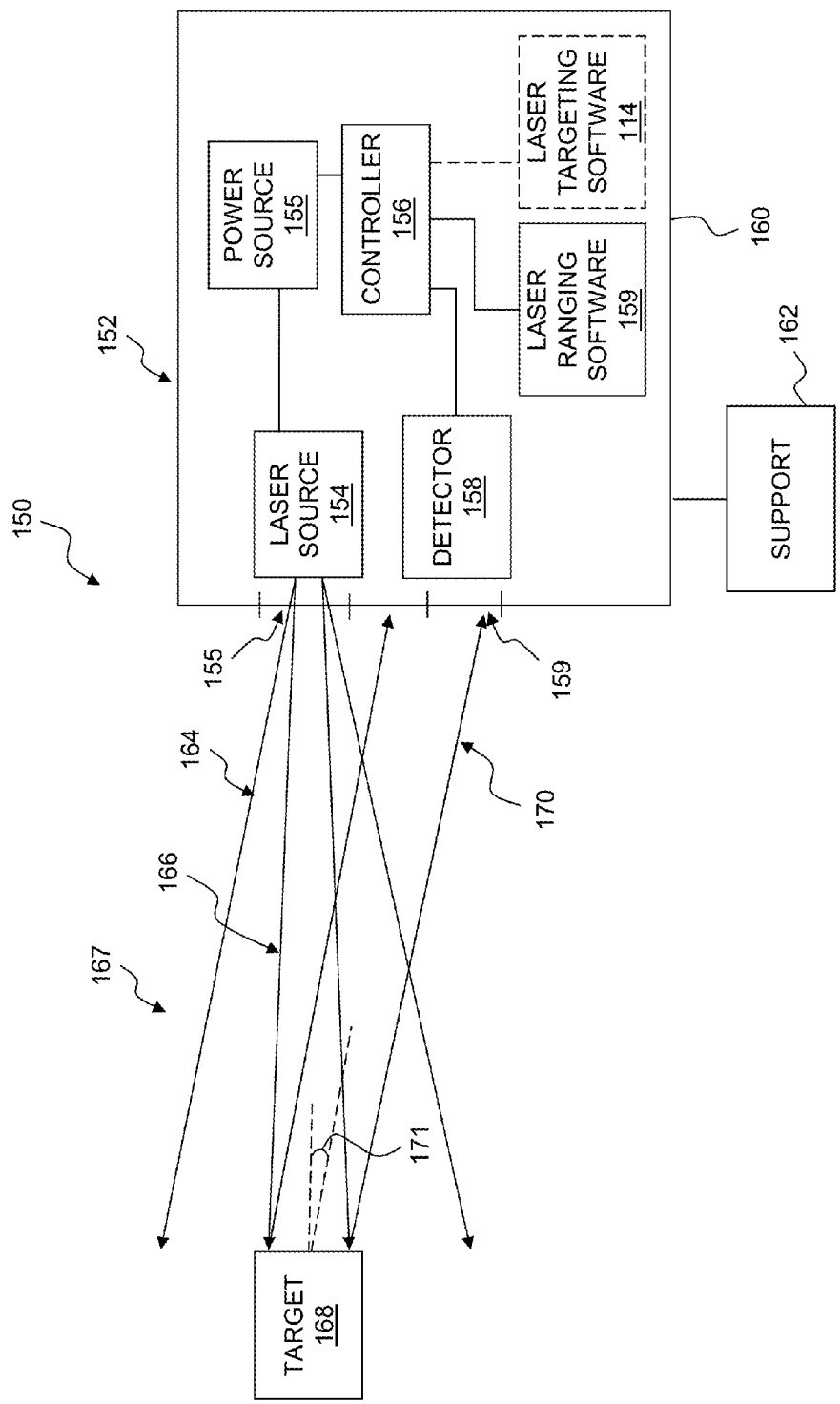
FIG. 2 is a representative view of an exemplary laser rangefinder application.

Laser targeting software 114 may be used to model a laser rangefinder application 150. An exemplary laser range finder application 150 is shown in FIG. 2. Referring to FIG. 2, a laser rangefinder device 152 is represented. Laser rangefinder device 152 includes a laser source 154, a power source 155, a controller 156, and a detector 158. Controller 156 is operatively coupled to power source 155 which controls the operation of laser source 154 and detector 158. In one embodiment, power source 155 is a pumping unit. Laser source 154, power source 155, controller 156, and detector 158 may be housed in a single housing 160 having optical windows for laser source 154 to emit radiation (window 155) and for detector 158 to receive radiation (window 159).

Laser rangefinder device 152 may be coupled to or included as a component of a support 162. Exemplary supports include powered moveable supports, such as vehicles, boats, aircraft, and stationary supports, such as a tripod.

Under the control of controller 156, laser source 154 emits a pulsed laser signal 164 (referred to herein as "Target Signal"). In one embodiment, the Target Signal 164 is a repetitive burst of energy at spaced apart instances. In one embodiment, the Target Signal 164 includes a code. In one example, the code is modulated on the Target Signal 164. In one example, the code is provided by the spacing of various bursts of energy of the Target Signal 164.

A first portion 166 of pulsed laser signal 164 is incident on a target object 168. A portion of this first portion 166 is reflected by target object 168. This reflected energy may be a specular reflection and/or a diffuse reflection based on the characteristics of target object 168. As shown in FIG. 2, a portion of the reflected energy 170 (referred to herein as "Reflected Target Signal") travels towards detector 158. The reflected energy, if of sufficient strength, is detected by detector 158. Based on the time of flight of Target Signal 164 and Reflected Target Signal 170, controller 156 is able to determine a range to target object 168 through laser ranging software 159.

However, many factors may limit or prevent Target Signal 164 reaching target object 168 or Reflected Target Signal 170 reaching detector 158. Examples include the characteristics of the laser source 154 and the associated optics of laser rangefinder 152, the characteristics of target object 168, the characteristics of an environment 167 that the radiation travels through from the laser rangefinder 152 to the target object 168 and back, the characteristics of detector 158 and the associated optics of laser rangefinder 152, and the distance between the laser rangefinder 152 and the target object 168. The laser targeting software 114, as explained herein, provides a user with the ability to predict the likelihood of laser rangefinder device 152 in detecting target object 168.

In one embodiment, laser rangefinder device 152 includes laser targeting software 114. Controller 156 is part of a computing system 100 and based on the information provided through laser targeting software 114, controller 156 controls power source 155. For instance, controller 156 may instruct power source 155 to increase the power level provided to laser source 154 to increase the likelihood of detecting a range to target object 168 with detector 158. In one embodiment, controller 156 instructs power source 155 to raise the output power of laser source 154 up to a first threshold. In one embodiment, the first threshold is set to minimize potential damage to the eyes of an operator of laser rangefinder device 152 due to the power output of laser source 154 being raised to high.

Figure 3:
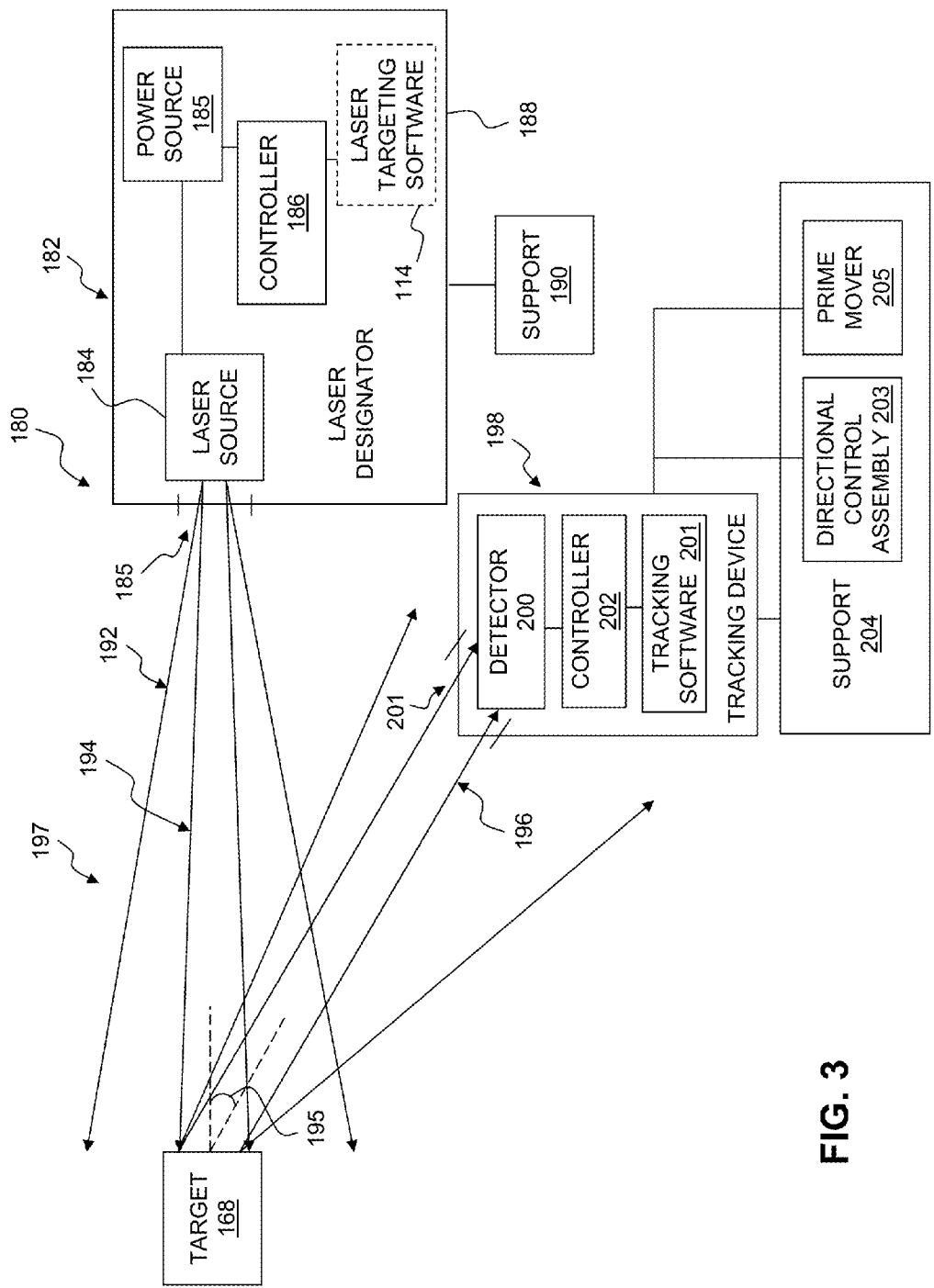
FIG. 3 is a representative view of an exemplary laser designator application.
Figure 3A:
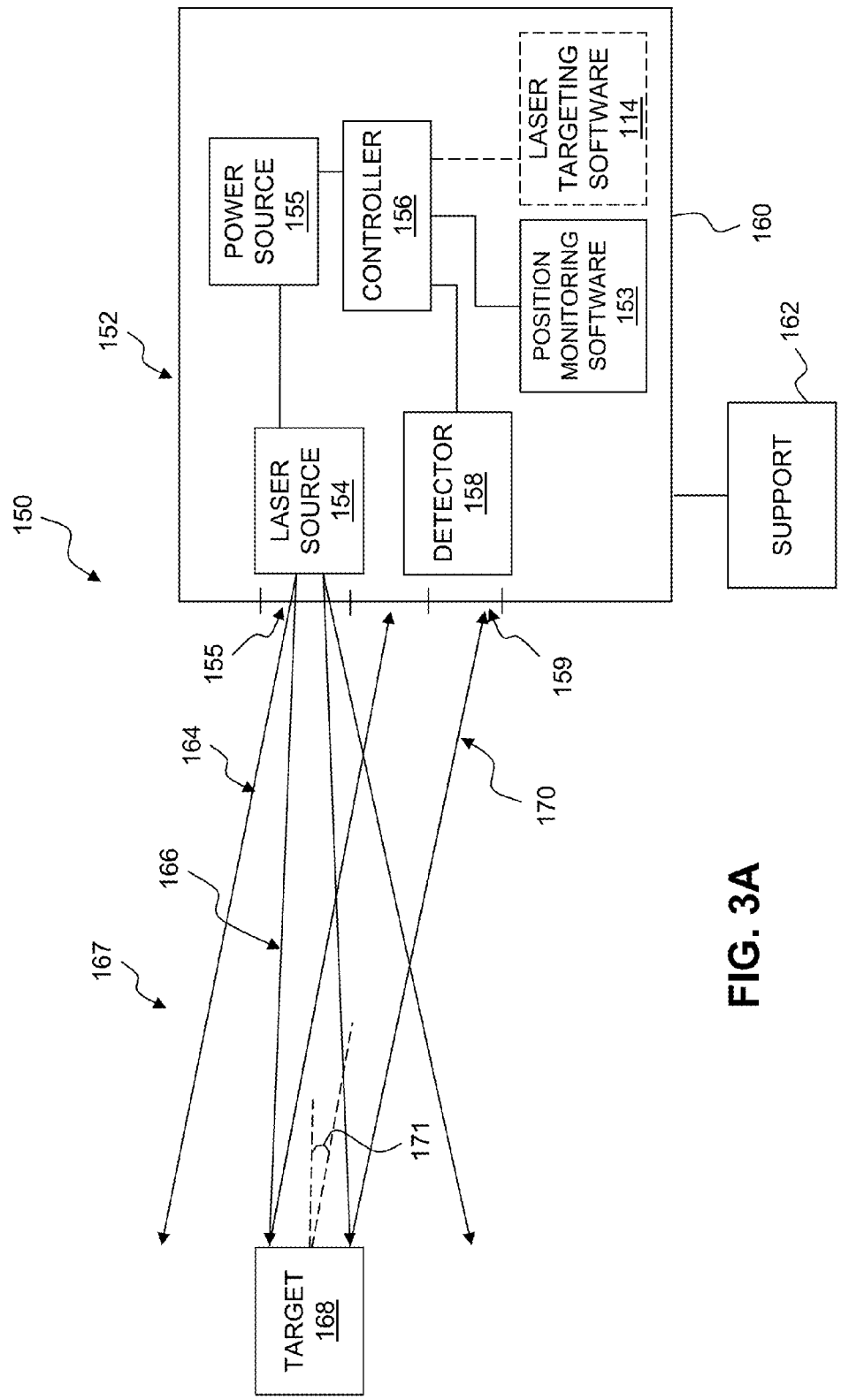
FIG. 3A is a representative view of an exemplary remote sensing application.

In one embodiment, laser rangefinder device 152 is used to sense changes in position of target object 168 and as such operates as a remote sensing system 151 (see FIG. 3A). In this embodiment, remote sensing system 151 includes position monitoring software 159 which in addition to determining a range to target object 168 also tracks the movement (positional changes) in target object 168 over time. Remote sensing system 151 may have many applications including volcano surveillance systems to detect movement of crater segments, off shore drilling rig systems to track the movement of portions of the rig which may indicate damage to the rig, and other systems for recording positional changes in an object.

Laser targeting software 114 may also be used to model a laser designator application 180. An exemplary laser designator application 180 is shown in FIG. 3. Referring to FIG. 3, a laser designator device 182 is represented. Laser designator device 182 includes a laser source 154 and a controller 186. Controller 186 is operatively coupled to laser source 154 and controls the operation thereof. Laser source 184 and controller 186 may be housed in a single housing 188 having an optical window 185 for laser source 184 to emit radiation.

Laser designator device 182 may be coupled to or included as a component of a support 190. Exemplary supports include powered moveable supports, such as vehicles, boats, aircraft, and stationary supports, such as a tripod or handheld device.

Under the control of controller 186, laser source 184 emits a pulsed laser signal 192 (referred to herein as "Target Signal"). In one embodiment, the Target Signal 192 is a repetitive burst of energy at spaced apart instances. In one embodiment, the Target Signal 192 includes a code. In one example, the code is modulated on the Target Signal 192. In one example, the code is provided by the spacing of various bursts of energy of the Target Signal 192.

A first portion 194 of pulsed laser signal 192 is incident on a target object 168. A portion of this first portion 194 is reflected by target object 168. This reflected energy may be a specular reflection and/or a diffuse reflection based on the characteristics of target object 168. As shown in FIG. 3, a portion of the reflected energy 196 (referred to herein as "Reflected Target Signal") travels towards a tracking device 198. Tracking device 198 includes a detector 200 and a controller 202. The reflected energy 196, if of sufficient strength, is detected by detector 200 through optical window 201 and recognized by controller 202 as a target object. Tracking device 198 is included as part of or coupled to a moveable support 204. Controller 202 through tracking software 201 provides instructions to a directional control assembly 203 of support 204 and a prime mover 205 of support 204 to control the movement of moveable support 204. In other embodiment, moveable support 204 includes a separate controller and controller 202 input to the controller of moveable support 204 which controls the movement of the moveable support by directional control assembly 203 and prime mover 205. In general, tracking device 198 tracks the location of target object 168 and moves in a direction towards the location of target object 168. Exemplary directional control assembly 203 include wings, blades, steering assemblies, and other devices for controlling a direction of moveable support 204. As is known in the art, these type of directional control assemblies alter a direction of travel of a moveable support. Exemplary prime mover 205 include internal combustion engines, electric motors, hybrid motors, solid fuel engines, jet turbine engines, or other devices which power the movement of tracking device 198. As is known in the art, these type of prime movers propel and alter a speed of travel of a moveable support.

In one embodiment, laser targeting software 114 may be used to determine the detectability between a communication transmitter and a communication receiver. In this scenario, target object 168 may be modeled as a perfect reflector and sized to prevent spillover.

Just like the laser rangefinder application 150, many factors may limit or prevent Target Signal 164 reaching target object 168 or Reflected Target Signal 170 reaching tracking device 198. Examples include the characteristics of the laser source 184 and the associated optics of laser designator 182, the characteristics of target object 168, the characteristics of an environment 197 that the radiation travels through from the laser designator 182 to the target object 168 and then to tracking device 198, the characteristics of detector 200 and the associated optics of tracking device 198, the distance between the laser designator 182 and the target object 168, and the distance between the target object 168 and the tracking device 198. The laser targeting software 114, as explained herein, provides a user with the ability to predict the likelihood of tracking device 198 in detecting target object 168.

In one embodiment, laser designator device 182 includes laser targeting software 114. Controller 186 is part of a computing system 100 and based on the information provided through laser targeting software 114, controller 186 controls a power source 185. For instance, controller 186 may instruct power source 185 to increase the power level provided to laser source 184 to increase the likelihood of detecting a range to target object 168 with detector 200. In one embodiment, controller 186 instructs power source 185 to raise the output power of laser source 184 up to a first threshold.

Figure 4:
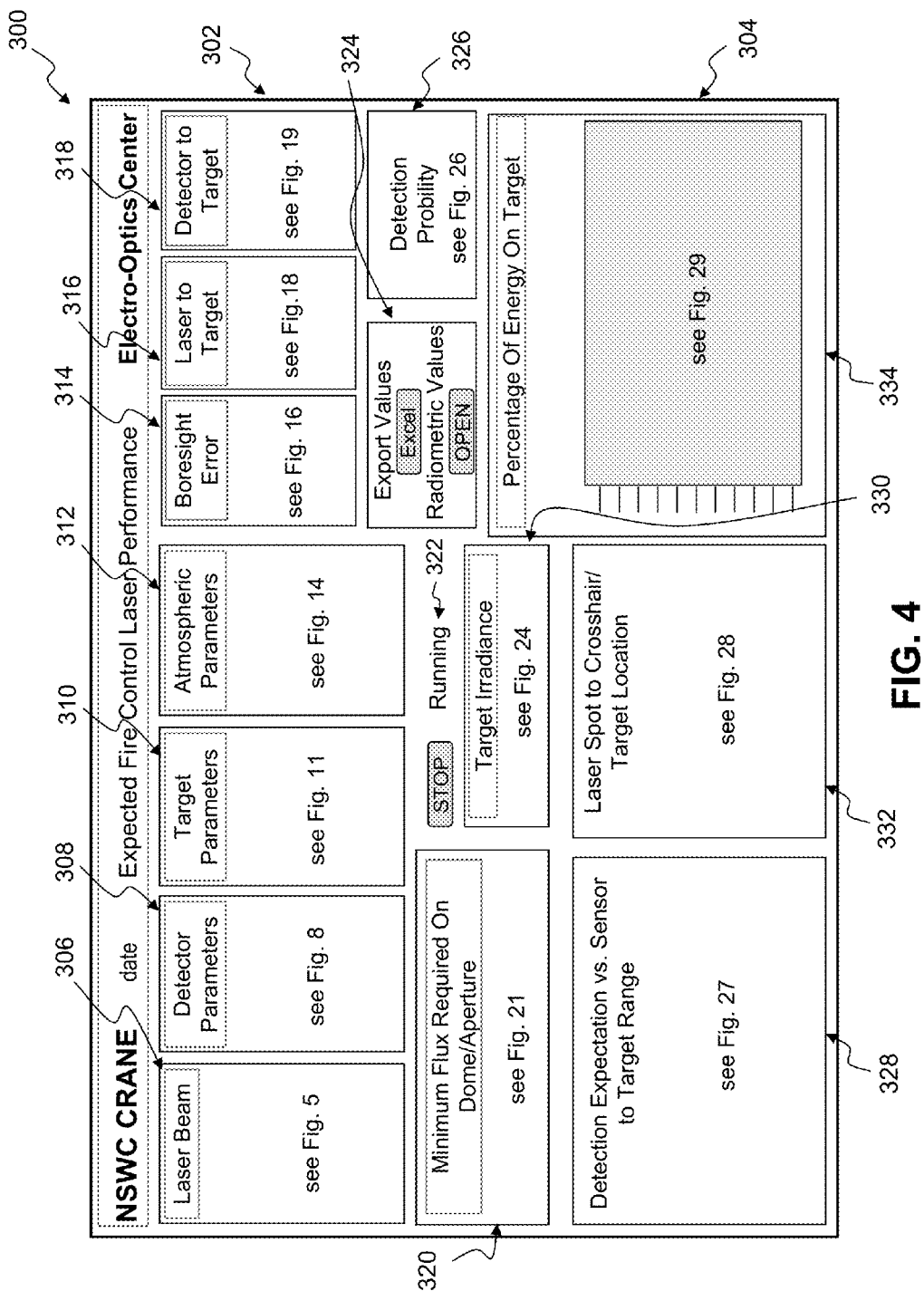
FIG. 4 is a representative view of an exemplary graphical user interface of the laser targeting software of FIG. 1.

Referring to FIG. 4, a user interface 300 of laser targeting software 114 is shown. User interface 300 is a graphical user interface displayed on a display 130 of computing system 100. Through an interaction with user interface 300 a user is able to specify parameters for one of laser rangefinder application 150 and laser designator application 180 through at least one user input devices 132. Exemplary user input devices 132 include buttons, knobs, keys, switches, a mouse, a touch screen, a roller ball, and other suitable devices for providing an input to computing system 100.

User interface 300 includes a plurality of input modules 302 and a plurality of output modules 304. In the illustrated embodiment, input modules 302 include a laser source input module 306, a detector input module 308, a target object input module 310, an environment input module 312, a pointing error input module 314, a source to target range input module 316, a detector to target range input module 318, and a minimum flux input module 320, a software control input module 322. Exemplary output modules include an auxiliary output module 324, a detection probability output module 326, a detection expectation over a range output module 328, a target irradiance output module 330, a laser spot alignment output module 332, and an energy on target output module 334.

Figure 5:
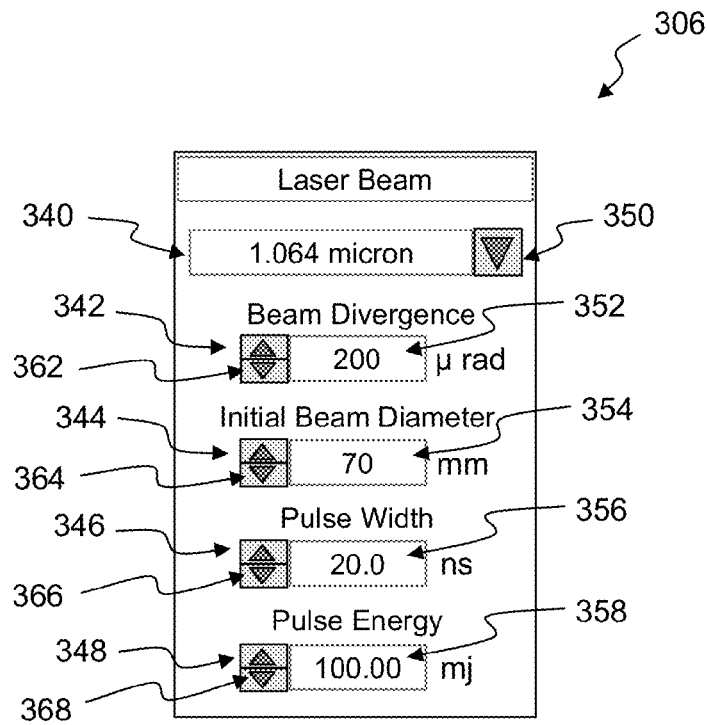
FIG. 5 is a representative view of an exemplary laser source input module of the graphical user interface of FIG. 4.

Referring to FIG. 5, an exemplary laser source input module 306 is shown. In the illustrated embodiment, laser source input module 306 includes five inputs, wavelength input 340, beam divergence input 342, initial beam diameter input 344, pulse width input 346, and pulse energy input 348. Each of inputs 340-348 may be any type of selection input whereby a user of user interface 300 may enter or select information, such as list boxes, drop-down lists, option buttons, toggles, check boxes, command buttons, entry fields, and other suitable selection inputs.

Wavelength input 340 permits the operator to enter a wavelength of laser source 154 of the laser rangefinder application 150 or laser source 184 of the laser designator application 180. Illustratively wavelength input 340 is a drop-down list. An operator selects expander input 350 to open the drop down list and show the various wavelengths for selection. The operator then highlights the desired wavelength. For inputs 342-348, an operator may enter a value in the respective entry fields 352-358 or adjust the displayed value up or down by a preset increment with the respective adjustment inputs 362-368.

Figure 6:
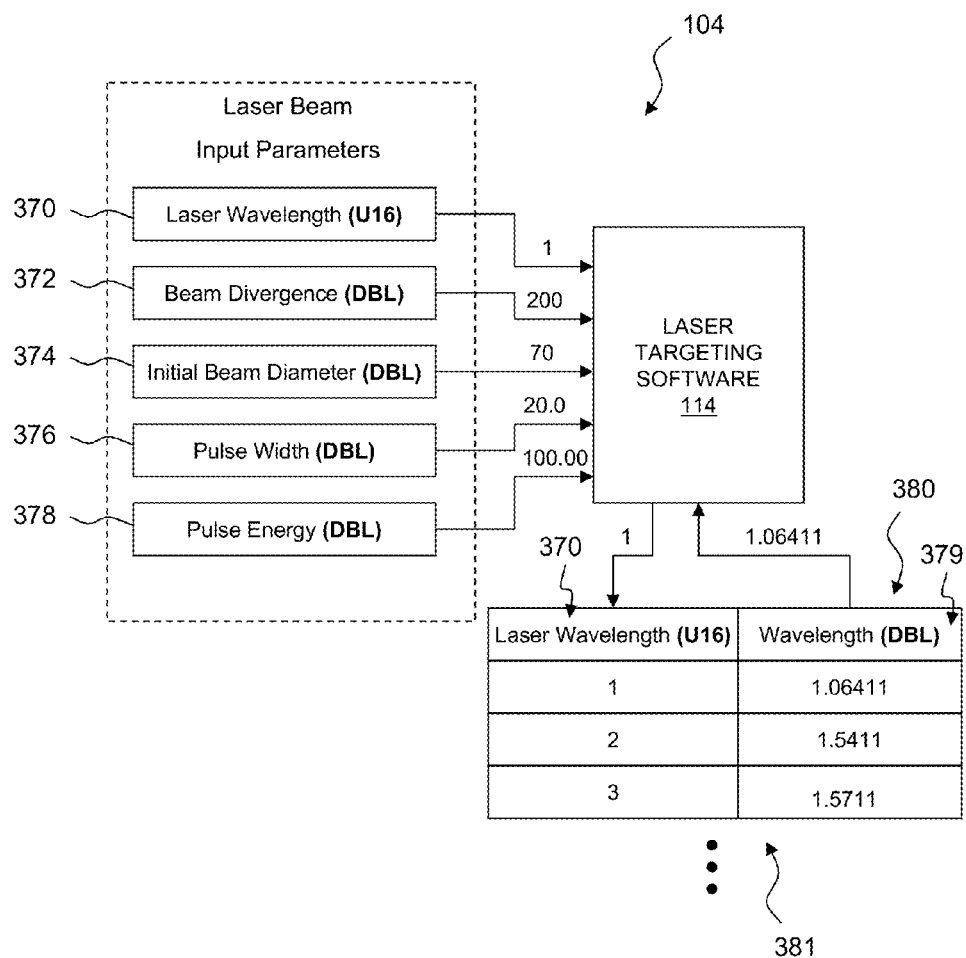
FIG. 6 is a representative view of the information stored on a memory accessible by the computing system of FIG. 1 relative to the exemplary laser source input module of FIG. 5.

Referring to FIG. 6, a representation of the data stored on memory 104 related to laser source input module 306 is shown. Five variables 370-378 are shown. Variable 370 corresponds to the input made through input 340 and is a word unsigned integer number (U16) that corresponds to an array value. Variable 370 is provided to or called by laser targeting software 114 which then looks for the corresponding wavelength value of a wavelength variable 379 in an array 380. Array 380 represents a library of wavelengths 381. In the illustrated example, the value of laser wavelength variable 370 is 1 and the corresponding value for wavelength variable 379 returned from array 380 is a double precision, floating point number (DBL) with a value of 1.06411 microns.

Figure 22:
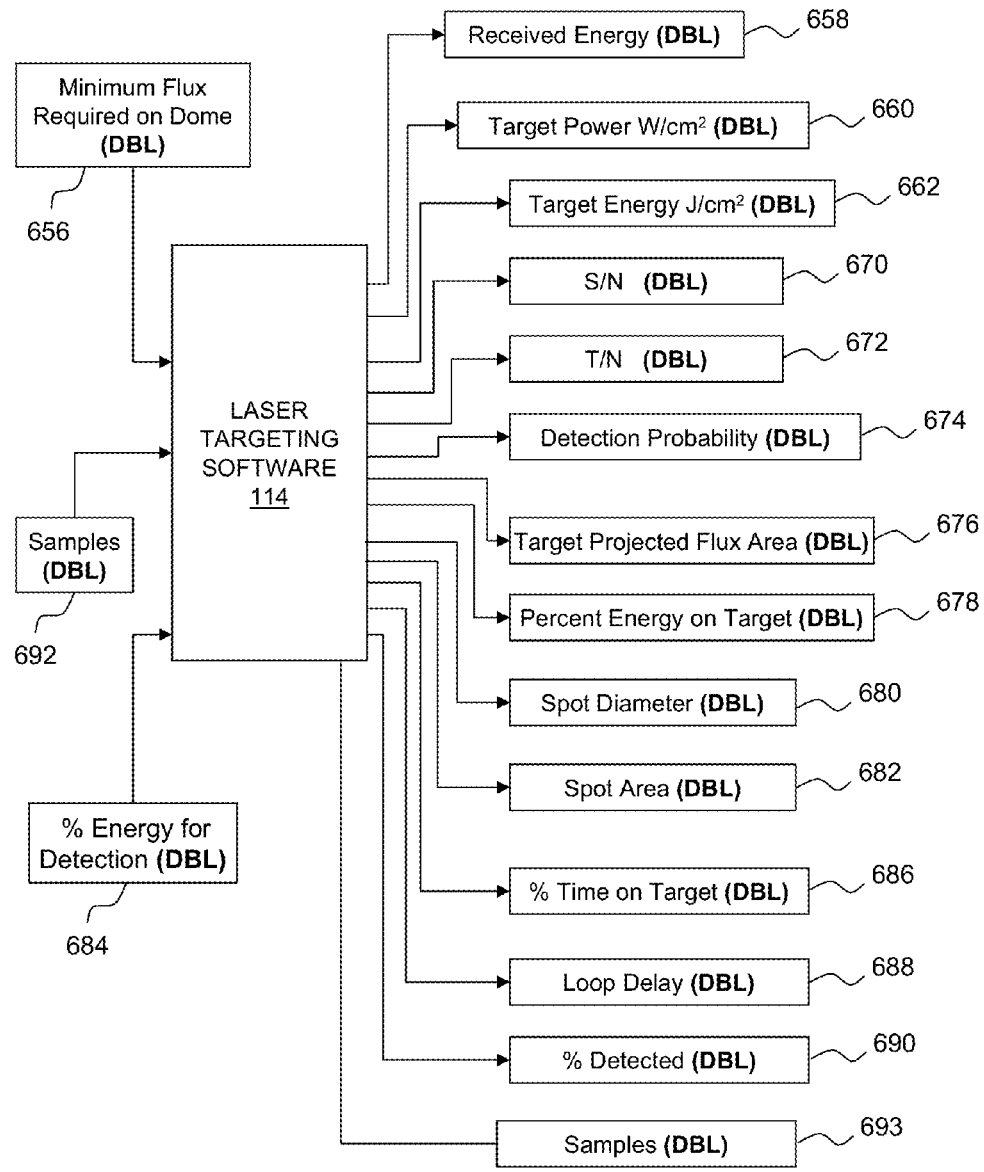
FIG. 22 is a representative view of the information stored on a memory accessible by the computing system of FIG. 1 relative to the exemplary minimum flux input module of FIG. 21 and relative to the exemplary energy on target output module of FIG. 29 and additional determined variables.

Variables 372-378 correspond to the inputs made through input 342-348. Variable 372 corresponds to the beam divergence of the laser source in micro-radians and variable 374 corresponds to the initial beam diameter of the laser source in millimeters. As a laser beam propagates from its source, the diameter of the laser beam increases or diverges from its initial beam diameter. With knowledge of the beam divergence angle (value of beam divergence variable 372), the diameter of the laser beam at the source (value of initial beam diameter variable 374), and the distance from the laser source to the target object 168 (value of laser to target variable 610 in FIG. 20), the area of the laser beam at the target object (value of spot area variable 682 in FIG. 22) may be determined.

Variable 376 specifies a pulse width of the laser source in nana-seconds. The pulse width of the laser source corresponds to the full width, half maximum (FWHM) of optical power vs. time for the laser source. As the pulse width or duration is shortened, the peak power of the pulse is increased.

Variable 378 specifies the pulse energy of the laser source in milli-Joules. The pulse energy is the total optical energy content of a pulse. For single pulses the pulse energy may be measured (e.g. with a pyro-electric device). The pulse energy (value of variable 378) together with the pulse duration (value of variable 376) may be used to estimate the peak power of pulses. Further, temporal integration of the optical power may be used to provide a value of the pulse energy. Typical pulse energies from Q-switched lasers range from micro joules (µj) to milli joules (mj) for large systems to even kilojoules (kj). Variables 372-378 are provided to or called by laser targeting software 114.

Figure 7:
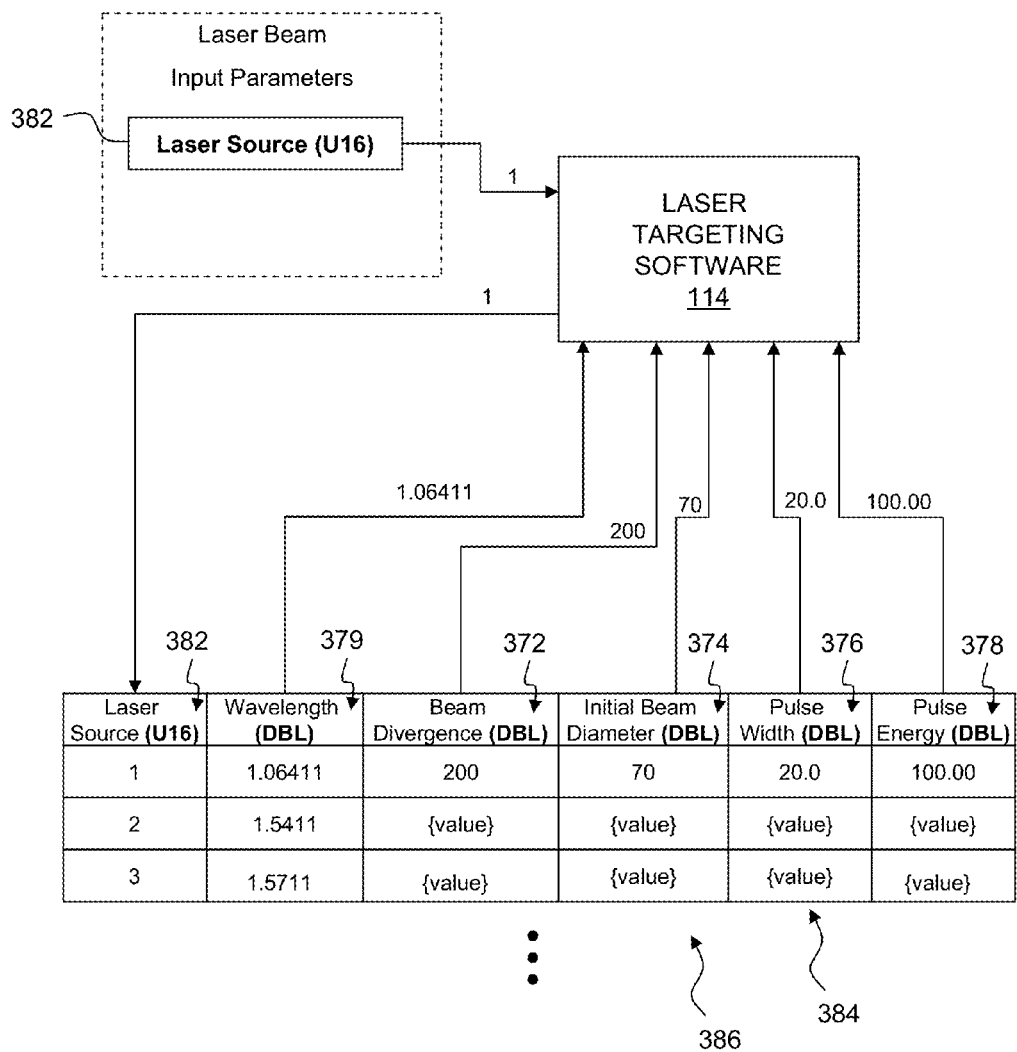
FIG. 7 is a representative view of the information stored on a memory accessible by the computing system of FIG. 1 relative to a library of laser sources.

Referring to FIG. 7, in one embodiment, a user through a selection input, such as a drop down list, selects a laser source from a library of possible laser sources. In this example, an operator provides a value for a single variable 382 based on the input made through the selection input. Variable 382 is a word unsigned integer number (U16) that corresponds to an array value. Variable 382 is provided to or called by laser targeting software 114 which then looks for the corresponding source variable values in an array 384. Array 384 represents a library of sources 386.

Figure 8:
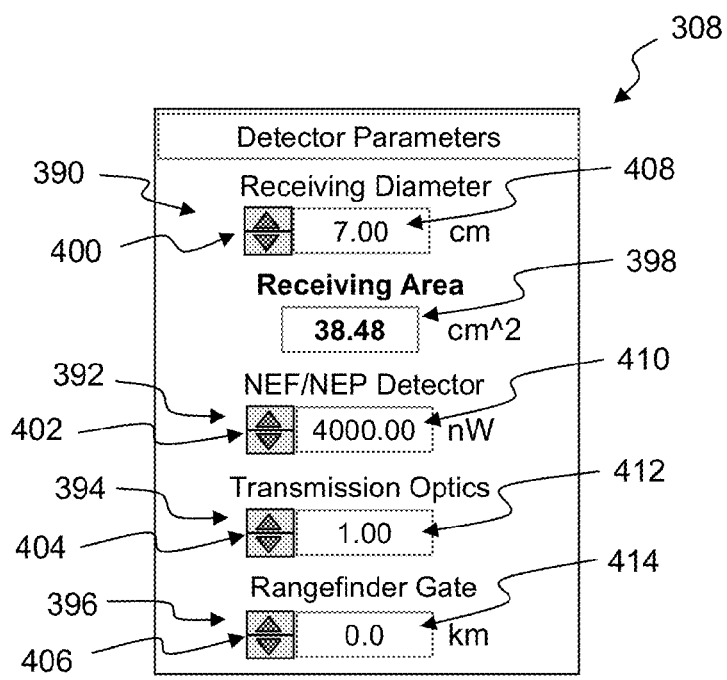
FIG. 8 is a representative view of an exemplary detector input module of the graphical user interface of FIG. 4.

Referring to FIG. 8, an exemplary detector input module 308 is shown. In the illustrated embodiment, detector input module 308 includes four inputs, receiving diameter input 390, NEF/NEP input 392, transmission optics input 394, and rangefinder gate input 396. Each of inputs 390-396 may be any type of selection input whereby a user of user interface 300 may enter information, such as list boxes, drop-down lists, option buttons, toggles, check boxes, command buttons, entry fields, and other suitable selection inputs.

Each of inputs 390-396, permit an operator to enter a value in the respective entry fields 408-414 or adjust the displayed value up or down by a preset increment with the respective adjustment inputs 400-406.

Figure 9:
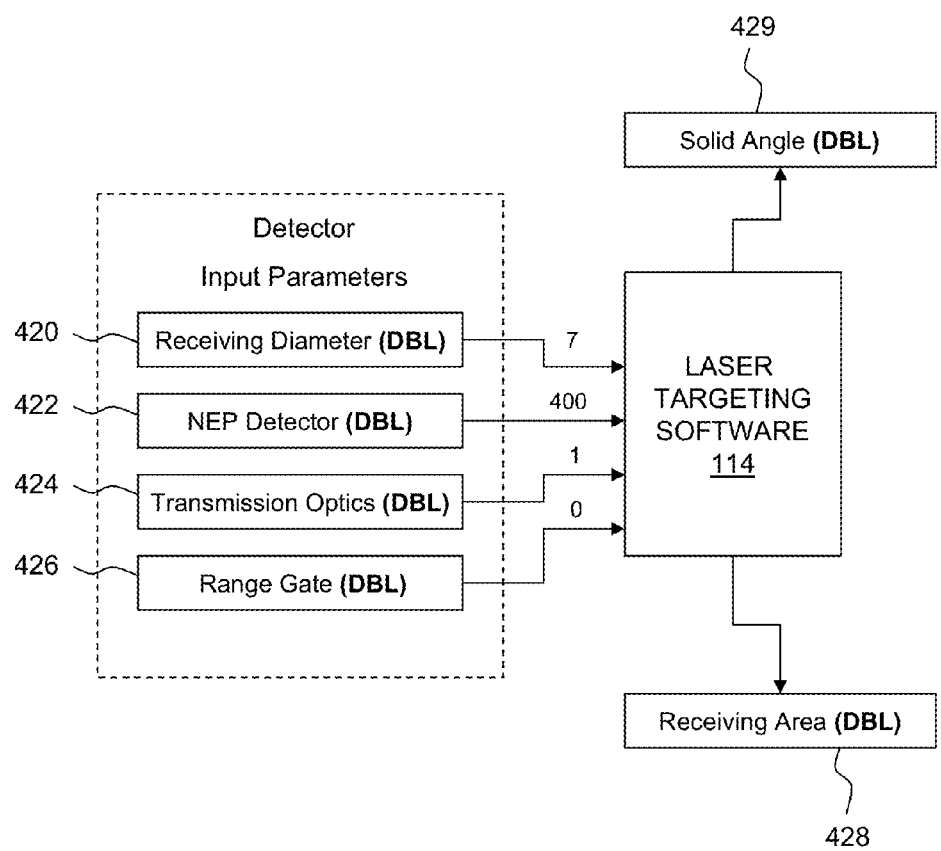
FIG. 9 a representative view of the information stored on a memory accessible by the computing system of FIG. 1 relative to the exemplary detector input module of FIG. 8.

Referring to FIG. 9, a representation of the data stored on memory 104 related to detector input module 308 is shown. Four variables 420-426 are shown. Variable 420 corresponds to the input made through input 390 and is a double-precision, floating-point number (DBL). In the illustrated example, the value of input 390 is 7 centimeters (cm). Based on the value of input 390, laser targeting software 114 determines a value of a receiving area variable 428 which is displayed in region 398 of detector input module 308. In the illustrated embodiment, the receiving area is assumed to be circular and is determined by laser targeting software 114 based on equation (1):

$$A_C = \frac{d^2}{4}\pi \quad (1)$$

wherein $A_C$ is the value of receiving area variable 428 and d is the value of variable 420. The value of receiving area variable 428 is used to evaluate the optical throughput of the system (a figure of merit for the optical subsystem) and the solid angle subtended. The solid angle that an object subtends at a point is a measure of how big that object appears to an observer at that point. For instance, a small object nearby could subtend the same solid angle as a large object far away. The solid angle is proportional to a surface area of a projection of that object onto a sphere centered at that point and divided by the square of the sphere's radius. A solid angle is related to the surface area of a sphere in the same way an ordinary angle is related to the circumference of a circle. In one embodiment, the solid angle is determined by laser targeting software 114 based on equation (2):

$$\Omega = \frac{A_C}{R_{TtoD}^2} \quad (2)$$

wherein $R_{TtoD}$ is the distance from target object 168, which acts as a source, and the detector (value of variable 621 in FIG. 20) and $A_C$ which is the receiving area of the detector (value of variable 428). The determined solid angle is stored as the value of a solid angle variable 429. The relationship of equation 2 assumes that $R_{TtoD}$ is greater than 10 to 20 times the maximum transverse dimension of the aperture or the source as defined by the sensor field of view.

Variable 422 corresponds to the NEP of the detector and is a DBL. Detector performances can be described in terms of a various figures of merit (such as the Responsively, Noise Equivalent Power ("NEP"), or Detectivity). NEP may be interpreted in three ways: 1) the smallest detectable change in the average radiant flux that can be detected, 2) the smallest average value of the absolute radiant flux that can be detected, and 3) the signal-to-noise ratio for a given average flux level. The value of variable 422 is either provided by the detector manufacturer or determined empirically.

Variable 424 corresponds to the transmission optics of the detector which collect the light from the target object 168 and is a DBL. Variable 424 is a representation of the losses caused by the optics of the detector device. The transmission value must be between 0.0 and 1.0. For instance, if the optics result in a five percent loss then the value of variable 424 should be set to 0.95. The value of variable 422 is either provided by the detector manufacturer or determined empirically.

Variable 426 corresponds to the range gate and is a DBL. A range gate value is typically specified for the laser rangefinder application 150. The range gate corresponds to a maximum range at which a valid target 168 will be accepted by laser targeting software 114. A target 168 detected at a distance above the value of the range gate will be discarded as being outside of the locating region. This value determines the gating in which laser targeting software 114 will accept a return pulse. The range gate is used to determine the value of the T/N variable 672 in equation 15 as described herein which in turn is used to determine the value of the detection probability variable 674 in equation 16 as described herein. In one embodiment, the value of variable 426 is from 0.0 to 30.0 kilometers (km). Laser targeting software 114 interprets a zero value for variable 426 as no range gate value is specified.

Figure 10:
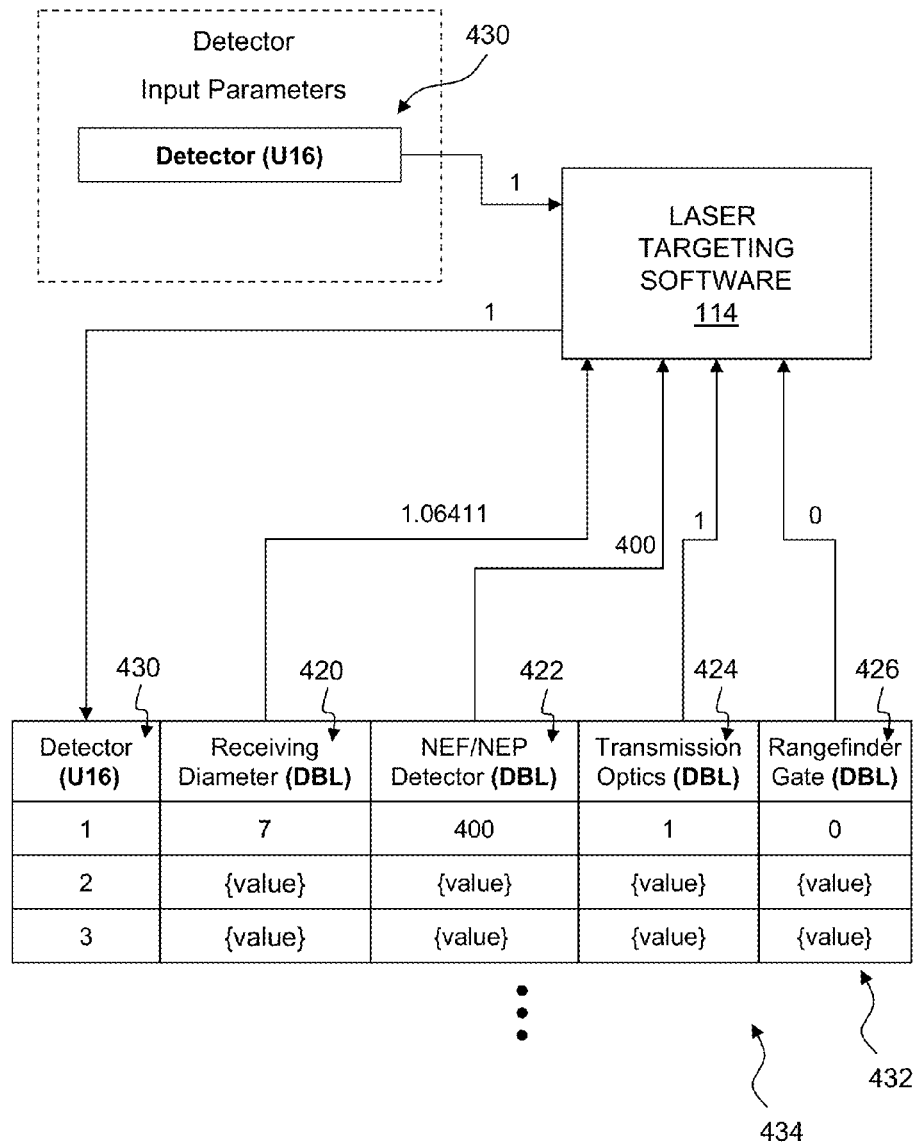
FIG. 10 is a representative view of the information stored on a memory accessible by the computing system of FIG. 1 relative to a library of detection systems.

Referring to FIG. 10, in one embodiment, a user through a selection input, such as a drop down list, selects a detector device from a listing of possible detector devices. In this example, an operator provides a value for a single variable 430 corresponding to the input made through the selection input. Variable 430 is a word unsigned integer number (U16) that corresponds to an array value. Variable 430 is provided to or called by laser targeting software 114 which then looks for the corresponding detector variable values in an array 432. Array 432 represents a library of detectors 434.

Figure 11:
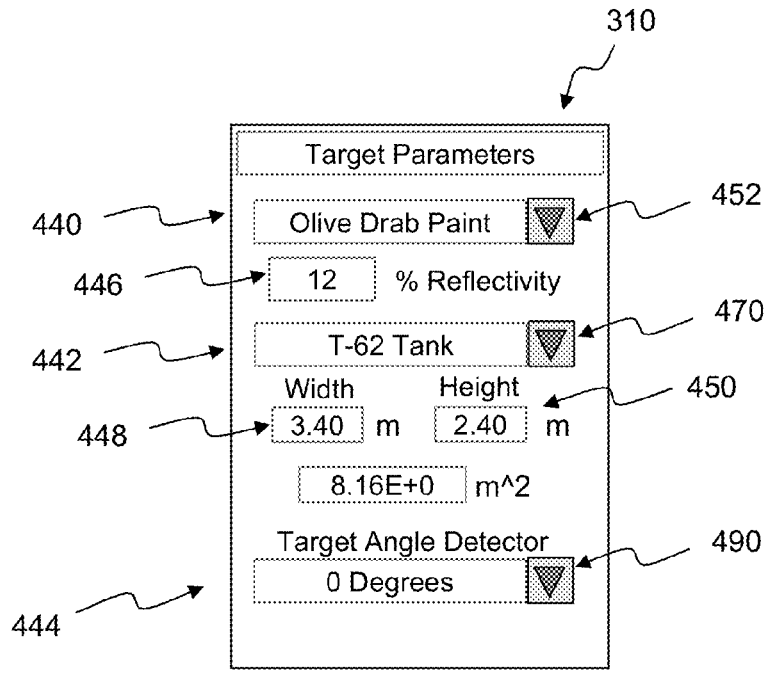
FIG. 11 is a representative view of an exemplary target object input module of the graphical user interface of FIG. 4.

Referring to FIG. 11, an exemplary target object input module 310 is shown. In the illustrated embodiment, target object input module 310 includes three inputs: target surface input 440, target type input 442, and target angle input 444. As mentioned herein, target object input module 310 further includes three user defined inputs: reflectivity input 446, target width input 448, and target height input 450. Each of inputs 440-450 may be any type of selection input whereby a user of user interface 300 may enter information, such as list boxes, drop-down lists, option buttons, toggles, check boxes, command buttons, entry fields, and other suitable selection inputs.

Target surface input 440 permits the operator to enter a characteristic of the reflective nature of target object 168. Illustratively target surface input 440 is a drop-down list. An operator selects expander input 452 to open the drop down list and show the various target surfaces for selection. The operator then highlights the desired target surface. In one embodiment, the available selections for input 440 are: Snow, White Masonry, Evergreen Trees, Broadleaf Trees, Beach Sand, Rough Wood, Smooth Concrete, Asphalt, Olive Drab Paint, Lava, Black Rubber, and User Defined. Each of the target surface input selections have a different Lambertian surface reflectivity value associated with the option selected. The reflectivity value is wavelength dependent.

Figure 12:
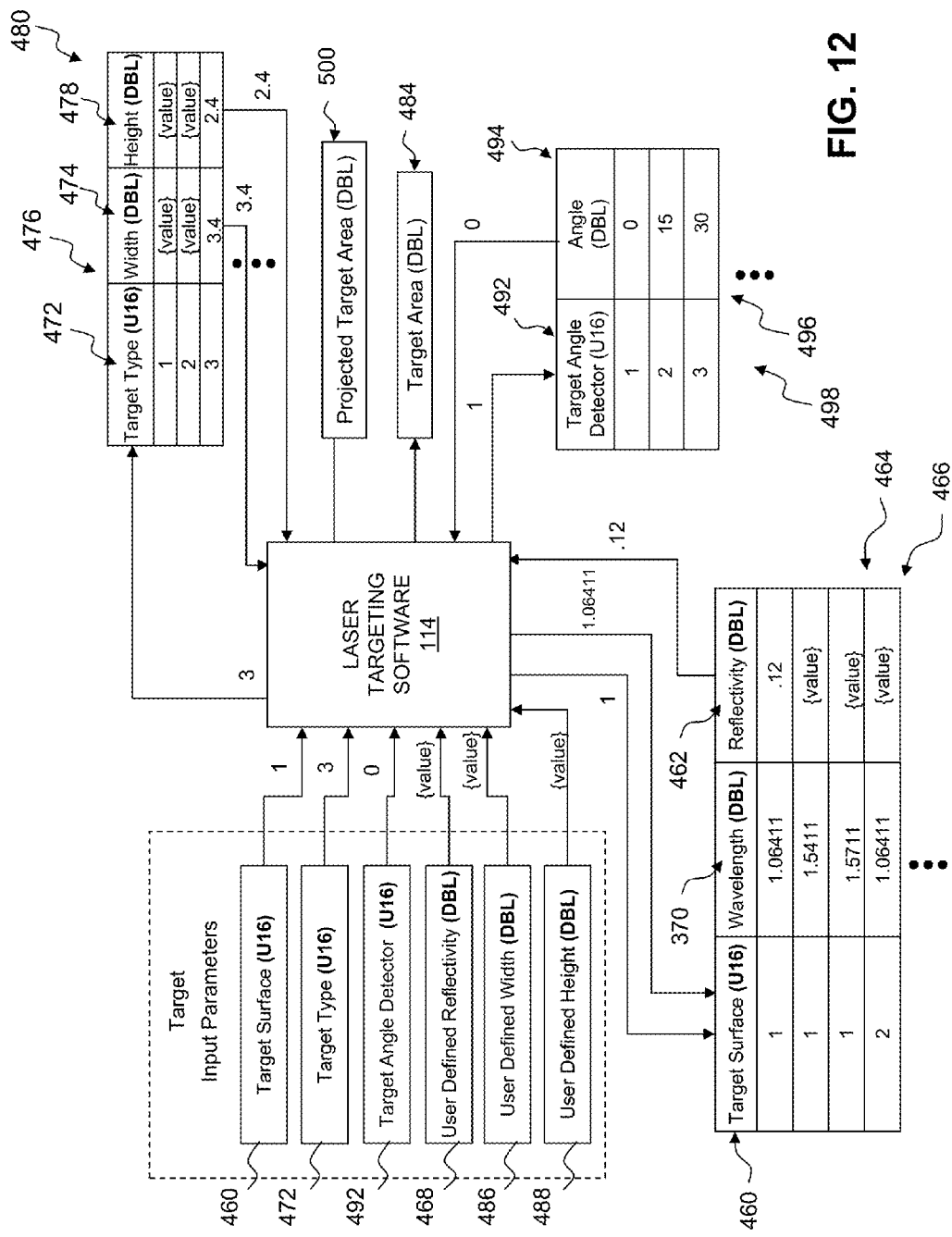
FIG. 12 a representative view of the information stored on a memory accessible by the computing system of FIG. 1 relative to the exemplary target object input module of FIG. 11.

Referring to FIG. 12, a representation of the data stored on memory 104 related to target object input module 310 is shown. A target surface variable 460 is shown which corresponds to the input made through target surface input 440. Variable 460 is a word unsigned integer number (U16) that corresponds to an array value. Variable 460 is provided to or called by laser targeting software 114 which then looks for the corresponding reflectivity value for a reflectivity variable 462 in an array 464. Array 464 represents a library of target reflectivity 466. As mentioned herein, the reflectivity of a target object is wavelength dependent. As such, laser targeting software 114 needs to both know the value of target surface variable 460 and wavelength variable 379 to select the correct value for reflectivity variable 462. In the illustrated example, the value of variable 460 is 1 and the value of variable 379 is 1.06411 (from FIG. 6). Based on these values the value of reflectivity variable 462 returned from array 464 is a double precision, floating point number (DBL) with a value of 0.12 or 12 percent. This value is displayed in input 446 of target object input module 310.

The "User Defined" option for target surface variable 460 selected through target surface input 440 signals to laser targeting software 114 to accept a value entered through input 446 as the value of reflectivity variable 462. This is illustrated in FIG. 12 as user defined reflectivity variable 468 which is a DBL. This allows a user to specify a specific reflectivity surface value when one of the available options for input 440 is not acceptable or where a particular reflectivity value has been empirically determined. The value of user defined reflectivity variable 468 is in the range of 0 to 1 and corresponds to a reflectivity of between 0% and 100%.

Target type input 442 permits the operator to enter a characteristic of the size of target object 168. Illustratively target type input 442 is a drop-down list. An operator selects expander input 470 to open the drop down list and show the various representations target objects for selection. The operator then highlights the desired representation of the desired target object. In one embodiment, the available selections for input 442 are: T-62 Tank, Square Box Model, Army Square Box, GMC Pickup (Side), Building, and User Defined. Each of the target type input selections have a different width and height value associated therewith that approximate the overall size of the actual target object. As such, each target representation is a quadrilateral representation of the actual target object. Other types of approximation may be used.

Returning to FIG. 12 and relative to target type input 442, a target type variable 472 is shown which corresponds to the selection made through target type input 442. Variable 472 is a word unsigned integer number (U16) that corresponds to an array value. Variable 472 is provided to or called by laser targeting software 114 which then looks for the corresponding width value for a width variable 474 in an array 476 and for the corresponding height value for a height variable 478 in array 476. Array 476 represents a library of target sizes 480. Once the value of width variable 474 and the value of height variable 478 are known, an area of target object 168 is determined based on equation (3):

$$A = xy \qquad (3)$$

wherein A is the target area (value of target area variable 484), x is the target width (value of target width variable 474) and y is the target height (value of target height variable 478). As mentioned herein, the area of target object 168 is used in the determination of the overlap of the laser spot at the target area. The target area is represented in FIG. 12 as target area variable 484 which is a DBL.

The "User Defined" selection option for target type variable 472 signals to laser targeting software 114 to accept a value entered through width input 448 as the value of width variable 474 and to accept a value entered through height input 450 as the value of height variable 478. This is illustrated in FIG. 12 as user defined width variable 486 which is a DBL and user defined height variable 488 which is a DBL. This allows a user to specify a width value for target object 168 and a height value for target object 168 when one of the available options for target type input 442 is not acceptable or where a particular target width value and target height value have been empirically determined.

Target angle input 444 permits the operator to enter a characteristic of the projected angle of the target surface normal to the sensor line of sight size of target object 168 (angle 171 in FIG. 2 and angle 195 in FIG. 3). Illustratively, target angle input 444 is a drop-down list. An operator selects expander input 490 to open the drop down list and show the various angles for selection. The operator then highlights the desired angle. In one embodiment, the available selections for input 444 are: 0 degrees; 15 degrees; 30 degrees; 45 degrees; 60 degrees; 75 degrees; and 90 degrees. Based on the angle, laser targeting software 114 may determine a projected target area which is the area of the target when viewed from an angle (angle 171 in FIG. 2 and angle 195 in FIG. 3). The projected area may be determined based on equation (4):

$$A_p = A \cos(\gamma) \quad (4)$$

wherein $A_p$ is the projected area (value of variable 500); A is the target area determined through equation (3) (value of variable 484), and $\gamma$ is angle 171 in FIG. 2 for laser rangefinder application 150 or angle 195 in FIG. 3 for laser designator application 180 (value of variable 494).

Returning to FIG. 12 and relative to target angle input 444, a target angle detector variable 492 is shown which corresponds to the selection made through target angle input 444. Target angle detector variable 492 is a word unsigned integer number (U16) that corresponds to an array value. Target angle detector variable 492 is provided to or called by laser targeting software 114 which then looks for the corresponding angle value for an angle variable 494 in an array 496. Array 496 represents a library of target to detector angles 498. Once the value of angle variable 494 and the value of target area variable 484 are known, the value of a projected area variable 500 is determined based on equation (4). The projected target area is represented in FIG. 12 as target area variable 500 which is a DBL. It is the value of target area variable 500 which is used in further calculations involving the size of the target object as viewed from the detector.

Figure 13:
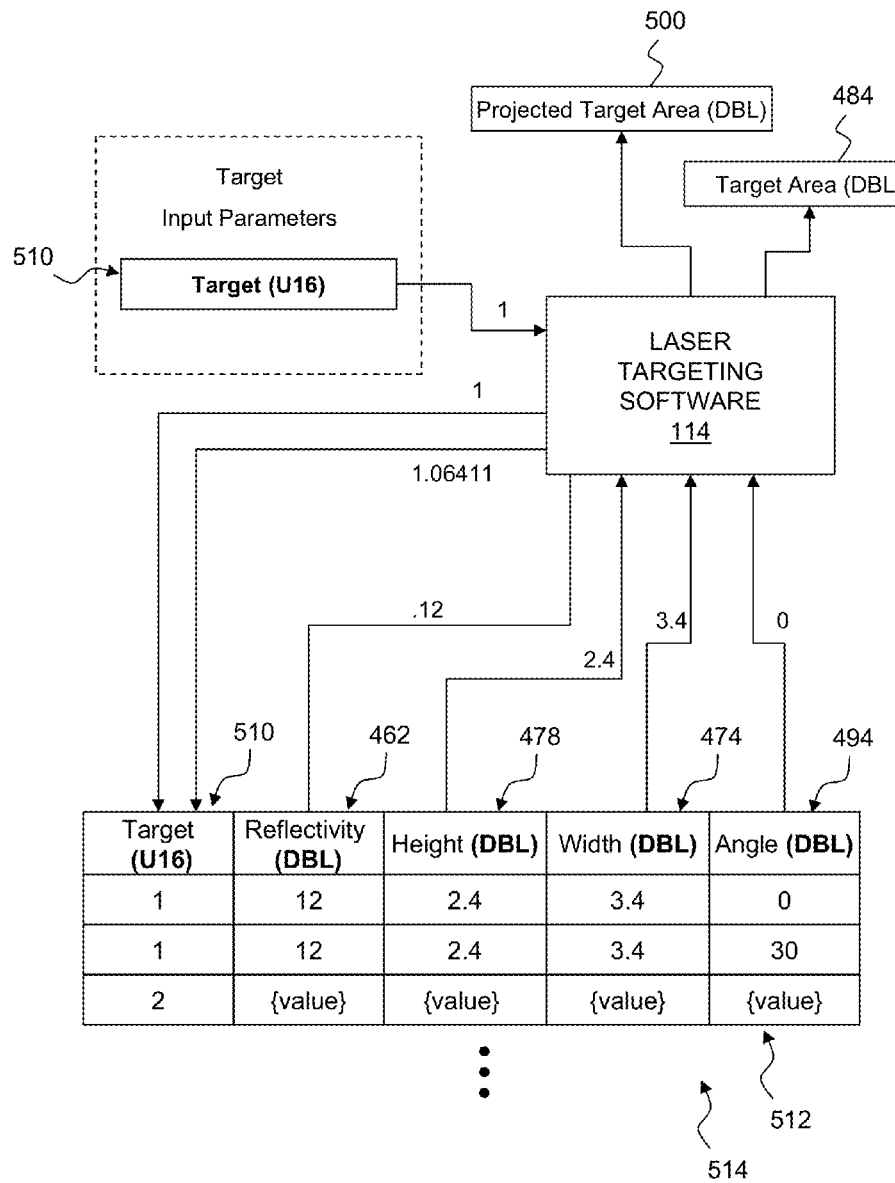
FIG. 13 is a representative view of the information stored on a memory accessible by the computing system of FIG. 1 relative to a library of target objects.

Referring to FIG. 13, in one embodiment, a user through a selection input, such as a drop down list, selects a target object from a listing of possible target objects. In this example, an operator provides a value for a single variable 510 corresponding to the selection made through the selection input. Variable 510 is a word unsigned integer number (U16) that corresponds to an array value. Variable 510 is provided to or called by laser targeting software 114 which then looks for the corresponding target variable values in an array 512. Array 512 represents a library of target objects 514.

Figure 14:
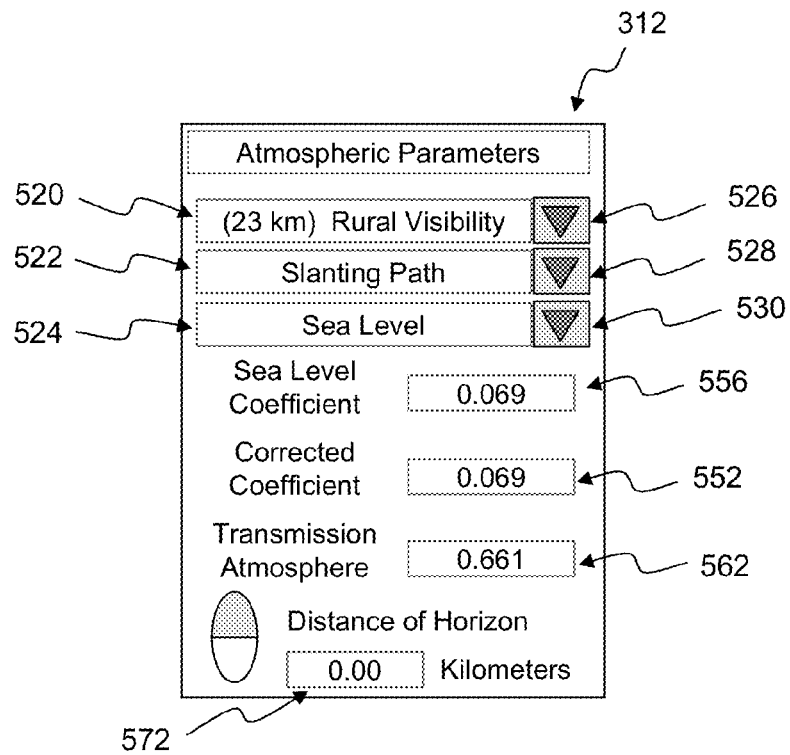
FIG. 14 is a representative view of an exemplary environment input module of the graphical user interface of FIG. 4.

Referring to FIG. 14, an exemplary environment input module 312 is shown. In the illustrated embodiment, environment input module 312 includes three inputs: visibility input 520, path type input 522, and altitude input 524. Each of inputs 520-524 may be any type of selection input whereby a user of user interface 300 may enter information, such as list boxes, drop-down lists, option buttons, toggles, check boxes, command buttons, entry fields, and other suitable selection inputs.

Visibility input 520 permits the operator to enter a characteristic of the visibility of the atmosphere or media through which the laser light is passing. Illustratively visibility input 520 is a drop-down list. An operator selects expander input 526 to open the drop down list and show the various atmospheric conditions for selection. The operator then highlights the desired atmospheric condition. As electromagnetic radiation, such as a laser beam, propagates through an atmosphere over some distance to a detector, it is observed that the intensity of the radiation reaching the sensor of the detector is reduced. The reduction in transmission of the light is caused by the scattering of radiation or the absorption of radiation by molecules or other particles in the atmosphere. The combination of scattering & absorption is called "extinction", because it is a decrease in the amount of radiation going in the initial direction. Atmosphere over and near the surface of the ocean will contain large amounts of salt and water vapor resulting in differing extinction coefficients than atmosphere over land. In one embodiment, the available selections for visibility input 520 are: (5 km) Rural Visibility; (5 km) Urban Visibility; (15 km) Rural Visibility; (23 km) Maritime Visibility; (23 km) Rural Visibility; (50 km) Tropospheric Visibility; Desert Extinction; and Vacuum.

Path type input 522 permits the operator to enter a characteristic of the path of the laser beam through which the laser light is passing. Illustratively path type input 522 is a drop-down list. An operator selects expander input 528 to open the drop down list and show the various path types for selection. The operator then highlights the desired path type. In one embodiment, the available selections for path type input 522 are: Slant Path and Horizontal Path. A slant path is typically characteristic of an application when a laser is being utilized from an air based platform.

Altitude input 524 permits the operator to enter an altitude at which the laser beam is passing. Illustratively altitude input 524 is a drop-down list. An operator selects expander input 530 to open the drop down list and show the various altitudes for selection. The operator then highlights the desired altitude. In one embodiment, there are twenty available selections for altitude input 524, Sea Level to twenty thousand feet in one thousand feet increments. Atmospheres near the ground surface will generally contain greater amounts of aerosol than the atmosphere in the region of the stratosphere resulting in differing extinction coefficients.

Figure 15:
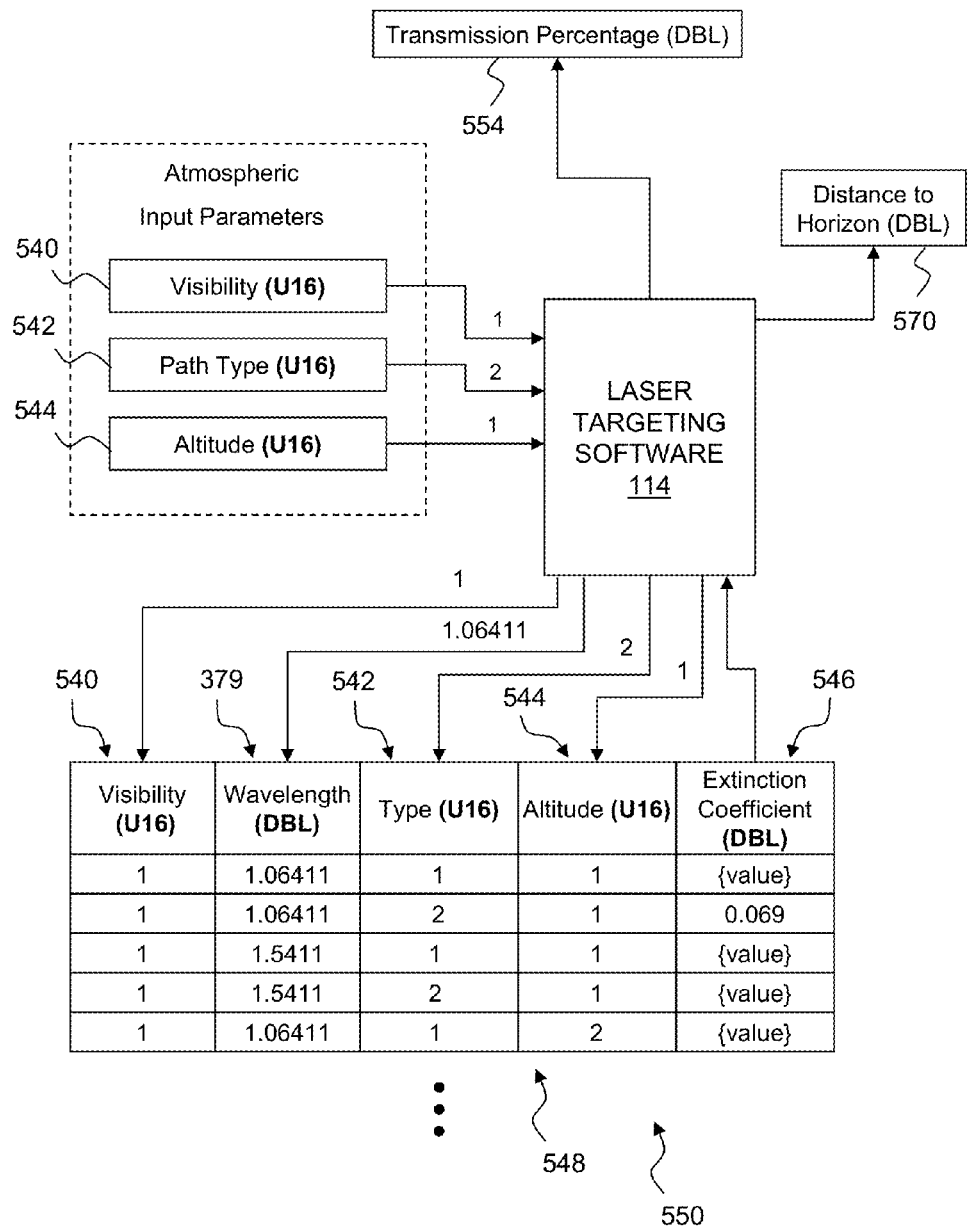
FIG. 15 a representative view of the information stored on a memory accessible by the computing system of FIG. 1 relative to the exemplary environment input module of FIG. 14.

Referring to FIG. 15, a representation of the data stored on memory 104 related to environment input module 312 is shown. Relative to visibility input 520, a visibility variable 540 is shown which corresponds to the selection made through visibility input 520. Variable 540 is a word unsigned integer number (U16) that corresponds to an array value. Relative to path type input 522, a path type variable 542 is shown which corresponds to the selection made through input 522. Path type variable 542 is a word unsigned integer number (U16) that corresponds to an array value. Relative to altitude input 524, an altitude variable 544 is shown which corresponds to the selection made through input 524. Altitude variable 544 is a word unsigned integer number (U16) that corresponds to an array value.

Figure 23:
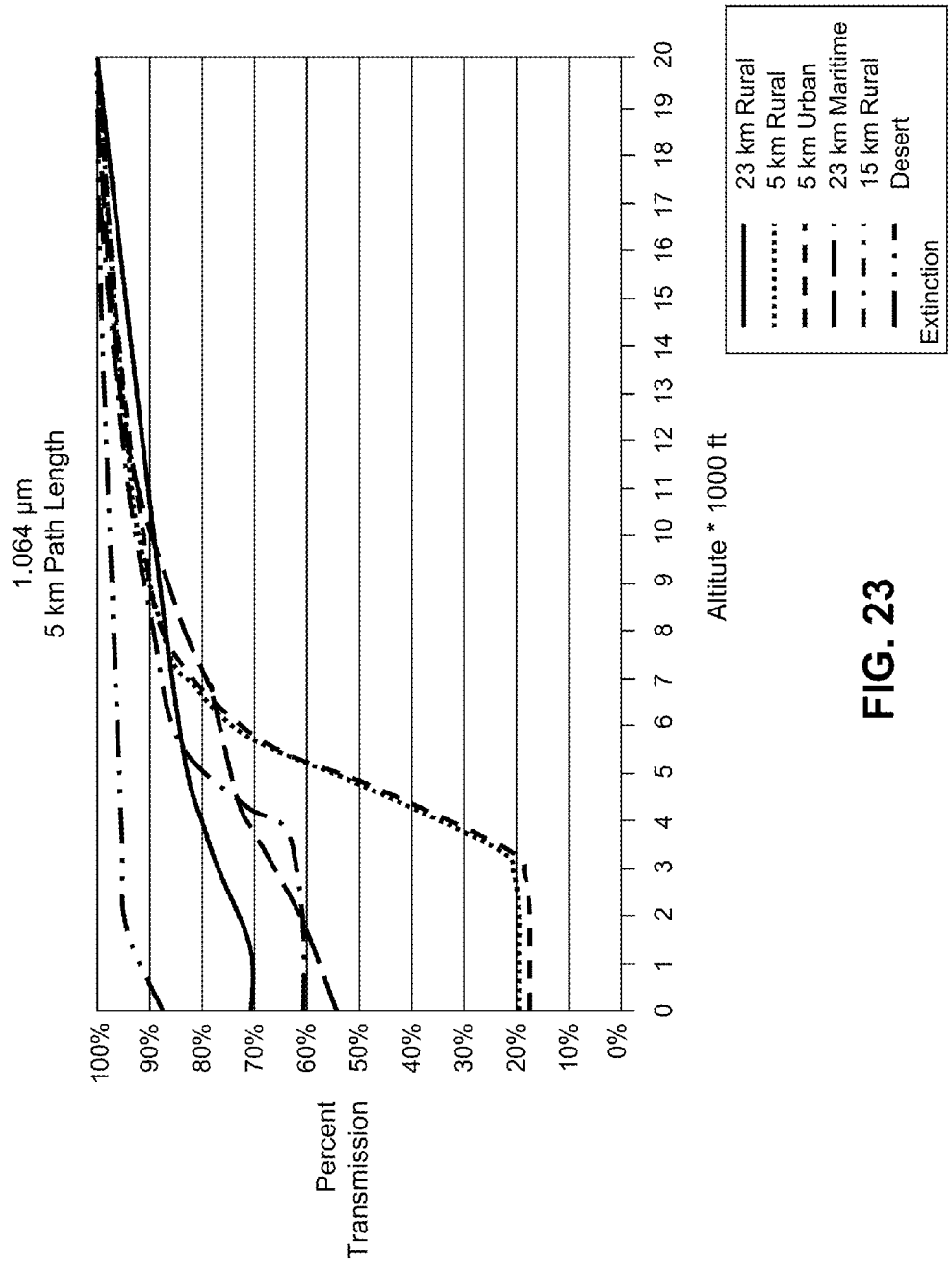
FIG. 23 is a representative view of the value of the transmission percentage variable of FIG. 15 as a function of the value of the altitude variable of FIG. 15 based on the value of the visibility variable of FIG. 15.

Variables 540, 542, 544 are provided to or called by laser targeting software 114 which then looks for the corresponding value for the extinction coefficient variable 546 in an array 548. Array 548 represents a library of environments 550. As mentioned herein, the extinction coefficient of an environment is wavelength dependent. As such, laser targeting software 114 needs to know the values of visibility variable 540, path type variable 542, altitude variable 544 and wavelength variable 379 to select the correct value for extinction coefficient variable 546. In the illustrated example, the value of variable 540 is 1, the value of variable 542 is 2, the value of variable 544 is 1, and the value of variable 379 is 1.06411. Based on these values the corresponding extinction coefficient returned from array 548 (the value of extinction coefficient variable 546) is a double precision, floating point number (DBL) with a value of 0.069. This value is displayed in region 552 of environment input module 312 which provides the average extinction coefficient along the path of the laser radiation based upon the atmospheric input value conditions chosen through visibility input 520 and path type input 522, but corrected for an altitude chosen through altitude input 524. This is the value used by laser targeting software 114 in determining the value of a transmission percentage variable 554 as explained herein. Shown in region 556 of environment input module 312 is the average extinction coefficient along the path of the laser radiation based upon the atmospheric input value conditions chosen through visibility input 520 and path type input 522 and with the assumption that the altitude is Sea Level. The changes in transmission percentage variable 554 as a function of altitude is illustrated in FIG. 23.

The values of extinction coefficient variable 546 are populated in the array 548 based on information from a PcLnWin model version of FASCODE available from Ontar located at 9 Village Way in North Andover, Mass. 01845-2000. The PcLnWin model calculates atmospheric transmission properties based on HITRAN database of spectroscopic parameters for atmospheric gases.

Based on the returned value of extinction coefficient variable 546, a value of transmission percentage variable 554 may be determined based on equation (5):

$$T = e^{-\sigma R} \qquad (5)$$

wherein T is the value of transmission variable 554, σ is the value of extinction coefficient variable 546, and R is the distance that the light travels through the material (the path length). In the case of laser rangefinder application 150, the value of transmission variable 554 may be used for both the traveling of light from laser source 154 to target object 168 and for the traveling of light from target object 168 to detector 158. In the case of laser designator application 180, different values of transmission variable 554 may be needed for the traveling of light from laser source 184 to target object 168 and for the traveling of light from target object 168 to detector 200. In one embodiment, the path length is the sum of the value of the laser to target variable 610 (see FIG. 20) and value of the detector to target variable 621 (see FIG. 20).

Based on the value of extinction coefficient variable 546 returned from array 548 the value of a transmission percentage variable 554 is determined which corresponds to the percentage of radiant flux transmitted along the entire path length from the respective laser source to the respective detector sensor. The value of variable 554 is shown in region 562 of environment input module 312. In one embodiment, the value of variable 554 is determined based on equation (5) wherein R is the distance from the laser source to the detector sensor.

Based on the altitude corresponding to the selection with altitude input 524, a value for a distance to horizon variable 570 is determined. In one embodiment the value for the horizon variable 570 is determined based on equation (6)

$$d = \sqrt{(2Rh + h^2)} \qquad (6)$$

wherein d is the value of horizon variable 570; R is the radius of the Earth; and h is the altitude corresponding to the selection with altitude input 524. The value of horizon variable 570 is shown in region 572 of environment input module 312.

Figure 16:
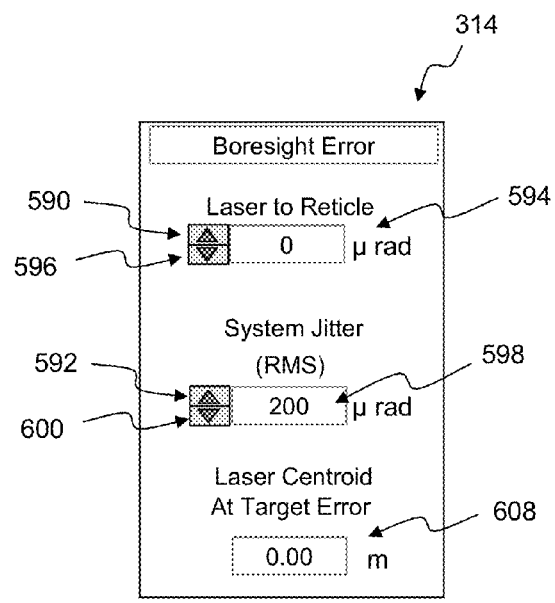
FIG. 16 is a representative view of an exemplary pointing error input module of the graphical user interface of FIG. 4.

Referring to FIG. 16, an exemplary pointing error input module 314 is shown. In the illustrated embodiment, pointing error input module 314 includes two inputs, laser to reticle error input 590 and system jitter error input 592. Each of inputs 590 and 592 may be any type of selection input whereby a user of user interface 300 may enter information, such as list boxes, drop-down lists, option buttons, toggles, check boxes, command buttons, entry fields, and other suitable selection inputs.

Laser to reticle error input 590 corresponds to a misalignment in an aiming mechanism employed to direct the laser beam onto target object 168. In the case of a multi-sensor imaging system, the display of the imaging device typically contains an overlay crosshair reticule onto which the laser beam centroid is aligned or boresighted to the display. Any misalignment causes the laser beam to not be centered on the reticule. Typically the device or system is evaluated to measure the boresight error of the system. This error is usually found to be less than 100 micro radians.

System jitter error input 592 corresponds to the system jitter of the laser designator or rangefinder. The laser and the sensor are to be line of sight stabilized in order to accurately direct the laser onto the target over time especially at large distances. In one embodiment, the laser is being "aimed" by using the video image generated from the sensor while sometimes under intense vibration from the moveable support. In the case of a laser designator application 180, a video autotracker is used for automatic steering of the laser designator onboard a platform so as to keep the aim point centered on the target. Once the autotracker is activated, it makes use of the video signal to acquire all or part of the image in order to keep it in the field of view. Typically a track box surrounds the target while keeping it centered and aligned to the crosshair reticule where the laser can then be utilized to mark the target. Some of the challenges that an autotracker encounters is a cluttered background, disturbances in the sensor field of view such as smoke and dust, a changing target image due to changes in direction and distance, changes in light conditions, changes in contrast, and changes due to multi-sensor motion. High quality trackers are capable of maintaining track with errors of less than 40 μrad.

The stabilization and tracker errors can be modeled as random Gaussian events that radially offset the beam from the boresight position on the target. Numbers of these events may be simulated and the percent of the energy that falls on the target for each case over some percentage of time or samples is calculated as discussed herein.

Laser to reticle error input 590 permits an operator to enter a value in the respective entry fields 594 or to adjust a displayed value up or down by a preset increment with the respective adjustment input 596. System jitter error input 592 permits an operator to enter a value in the respective entry fields 598 or to adjust a displayed value up or down by a preset increment with the respective adjustment input 600.

Figure 17:
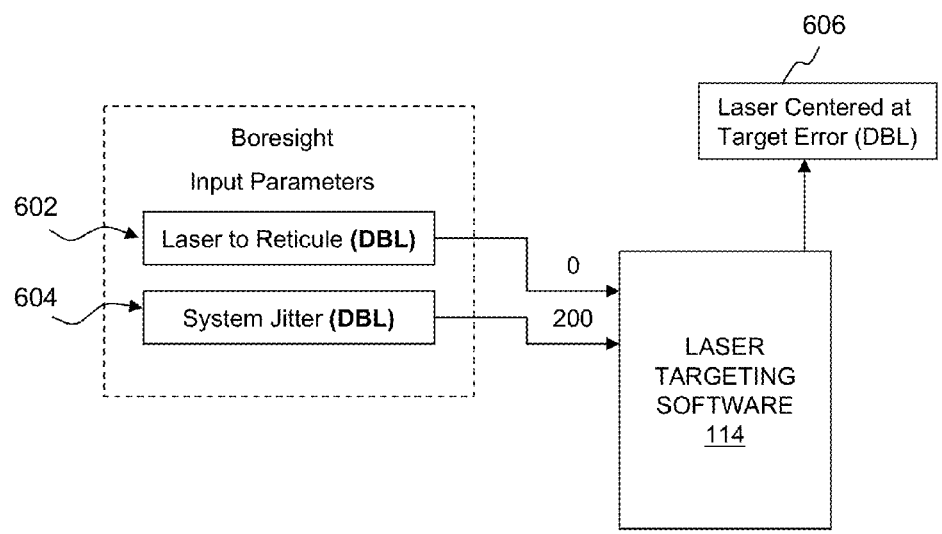
FIG. 17 a representative view of the information stored on a memory accessible by the computing system of FIG. 1 relative to the exemplary pointing error input module of FIG. 16.

Referring to FIG. 17, a representation of the data stored on memory 104 related to pointing error input module 314 is shown. Two variables 602 and 604 are shown. Laser to reticule variable 602 corresponds to the input made through input 590 and is DBL. Variable 604 corresponds to the input made through input 592 and is DBL. Variables 602 and 604 are provided to or called by laser targeting software 114.

Based on the value of laser to reticule variable 602, laser targeting software 114 determines a value for a laser centroid at target error variable 606. In one embodiment, the value of target error variable 606 is determined based on equation (7):

$$d = r \tan(\theta) \quad (7)$$

wherein d is the value of target error variable 606, r is the value of the laser to target variable 610; and θ is the value of laser to reticule variable 602. The value of target error variable 606 is displayed in region 608 of pointing error input module 314.

Figure 18:
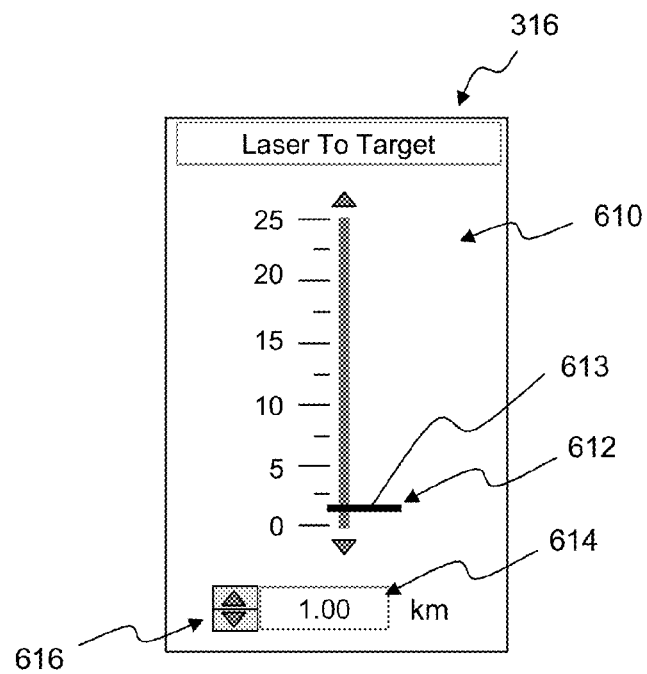
FIG. 18 is a representative view of an exemplary source to target range input module of the graphical user interface of FIG. 4.

Referring to FIG. 18, an exemplary source to target range input module 316 is shown. In the illustrated embodiment, source to target range input module 316 includes a laser to target range input 610. Input 610 may be any type of selection input whereby a user of user interface 300 may enter information, such as list boxes, drop-down lists, option buttons, toggles, check boxes, command buttons, entry fields, and other suitable selection inputs. Input 610 includes three ways to specify a value for a laser to target range variable 610 (see FIG. 20), a slider input 612 whereby a user "grabs" the slider bar 613 and moves it up or down, an input box 614 whereby a user types in a value, and adjustment input 616 whereby a user adjusts the displayed value by a preset increment.

Figure 19:
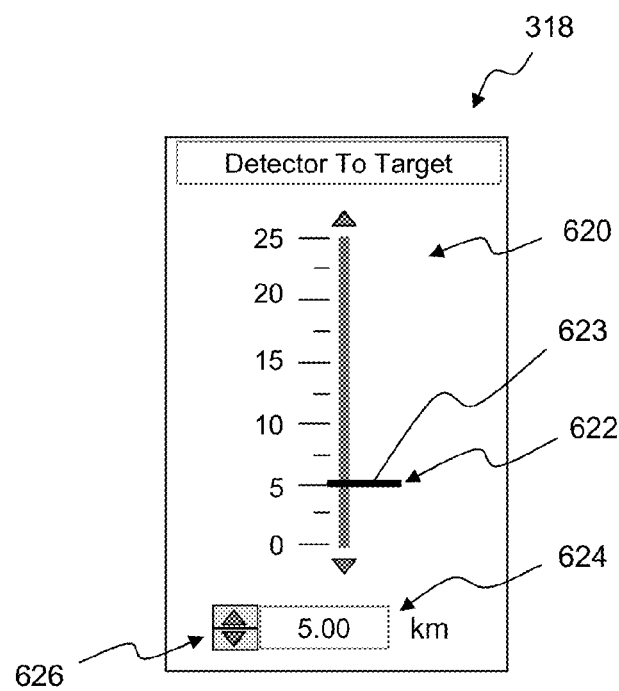
FIG. 19 is a representative view of an exemplary detector to target range input module of the graphical user interface of FIG. 4.

Referring to FIG. 19, an exemplary detector to target range input module 318 is shown. In the illustrated embodiment, detector to target range input module 318 includes a laser to target range input 620. Input 620 may be any type of selection input whereby a user of user interface 300 may enter information, such as list boxes, drop-down lists, option buttons, toggles, check boxes, command buttons, entry fields, and other suitable selection inputs. Input 620 includes three ways to specify a value for a target to detector range variable 621 (see FIG. 20), a slider input 622 whereby a user "grabs" the slider bar 623 and moves it up or down, an input box 624 whereby a user types a value, and adjustment input 626 whereby a user adjusts the displayed value by a preset increment.

In the case of laser rangefinder application 150, the values for target range variable 610 and detector range variable 621 are equal. In the case of laser designator application 180, the values of target range variable 610 and detector range variable 621 may be different.

Figure 20:
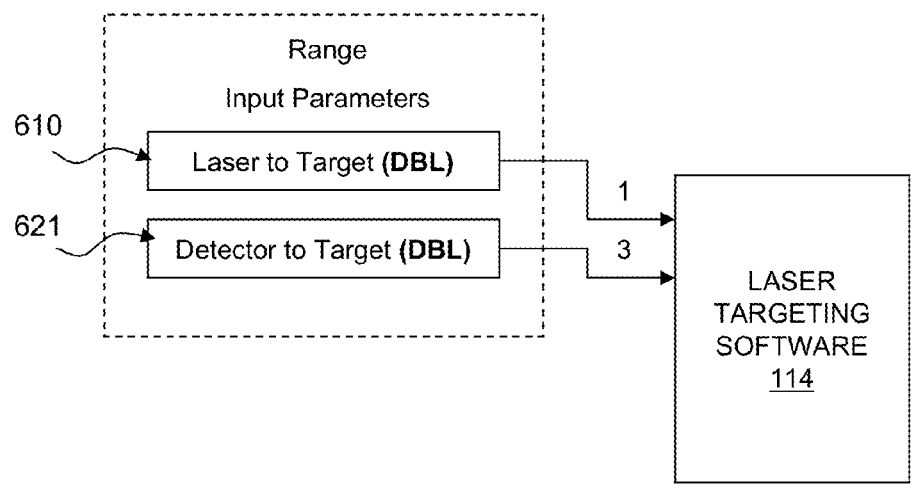
FIG. 20 a representative view of the information stored on a memory accessible by the computing system of FIG. 1 relative to the exemplary source to target range input module of FIG. 18 and relative to the exemplary detector to target range input module of FIG. 19.

Referring to FIG. 20, a representation of the data stored on memory 104 related to source to target range input module 316 and detector to target range input module 318 is shown. Two variables 610 and 621 are shown. Variable 610 corresponds to the input made through input 610 and is DBL. Variable 621 corresponds to the input made through input 620 and is DBL. Variables 610 and 621 are provided to or called by laser targeting software 114.

Figure 21:
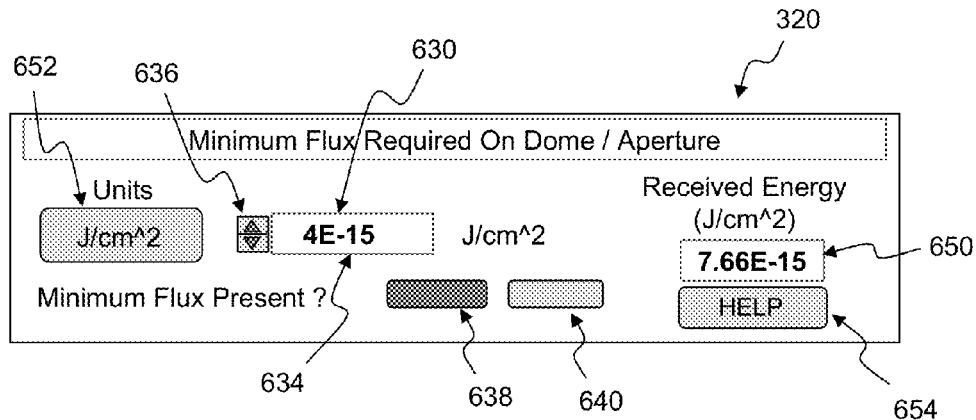
FIG. 21 is a representative view of an exemplary minimum flux input module of the graphical user interface of FIG. 4.

Referring to FIG. 21, an exemplary minimum flux input module 320 is shown. In the illustrated embodiment, minimum flux input module 320 includes a minimum flux on dome input 630. Input 630 may be any type of selection input whereby a user of user interface 300 may enter information, such as list boxes, drop-down lists, option buttons, toggles, check boxes, command buttons, entry fields, and other suitable selection inputs. Input 630 includes two ways to specify a value for a Minimum Flux on Dome variable 656 (see FIG. 22), a input box 634 whereby a user types a value, and an adjustment input 636 whereby a user adjusts a displayed value by a preset increment.

The minimum flux required at the surface of the dome or detector is a parameter specified by the detector manufacturer. When this value is available, the value may be specified through input 630 (see FIG. 21). Minimum flux input module 320 includes a first indicator 638 which is a region that is illuminated green to indicate the presence of the minimum flux and a second indicator 640 which is a region that is illuminated red to indicate the absence of the minimum flux. In some instances values for the detector inputs are not known (e.g. the transmission of the optics, NEP of the detector) as these are engineering design values not made available. However, a value is typically given for the amount of flux needed on the dome or aperture of the detector in W/cm2 or J/cm2 (input with 630). In such a scenario the amount of flux is input with 630 and the diameter of the dome or aperture (variable 420) in the detector parameters. The value displayed in 650 is compared to the value input with 630 and indicators 638, 640 provide a visual feedback if the minimum flux is present.

In one embodiment, laser targeting software 114 determines the flux received by the detector and displays this value in region 650 of minimum flux input module 320. The flux incident upon the detector area may be determined based on equation (8)

$$\phi = \frac{L_S A_S A_C}{R^2} \quad (8)$$

wherein $\phi$ the flux incident upon the detector (value of received energy variable 658); $L_S$ is the radiance of target object 168 (see below); $A_S$ is the area of the source (the area of the fractional amount of the laser spot from equation 11); $A_C$ is the detection area (value of receiving area variable 428); and R is the distance between target object 168 and the detector (value of detector range variable 621). The radiance of target object 168 ($L_S$) may be determined based on equation (9)

$$L_S = \frac{E_{ref}}{\pi} \quad (9)$$

wherein $E_{ref}$ is the irradiance of target object 168 (value of target energy variable 662) and π is a constant. The irradiance of target object 168 ($E_{ref}$) may be determined by equation (10)

$$E_{ref} = EL \quad (10)$$

wherein E is the irradiance incident on target object 168 and L is the Lambertian reflectivity of in the direction of the detector (value of reflectivity variable 462). The irradiance incident on target object 168 (E) may be determined by equation (11)

$$E = \frac{TPA}{a} \quad (11)$$

wherein T is the atmospheric path transmission (value of variable 560); P is the power of the laser pulse (the product of the value of variable 376 and the value of variable 378); a is the area of the laser spot at the target plane (value of spot area variable 682); and A is the fractional amount of the laser spot area (a) irradiating the target object 168. The laser spot area (a) may be determined by equation 12

$$a = \frac{(a_{source}^2 + \Phi r^2)\pi}{4} \quad (12)$$

wherein $a_{source}$ is the diameter of the laser beam at the source (the value of variable 374); $\Phi$ is the beam divergence angle in radians (the value of variables 372); and r is the range from the source to the target plane (the value of target range variable 610). The fractional amount is determined based on knowing the center of the laser beam (TEM00 mode) relative to the target object. The area of the circle (laser beam) that intersects with the rectangle (target object) may be determined by standard geometrical relationships.

Through input 652, an operator of user interface 300 may select the units to specify the value for the minimum flux required on the dome. Input 652 toggles between two options: Watts/cm² and Joules/cm². Also, through input 654, an operator of user interface 300 may launch a help file which provides information of the operation of user interface 300 and laser targeting software 114.

Figure 24:
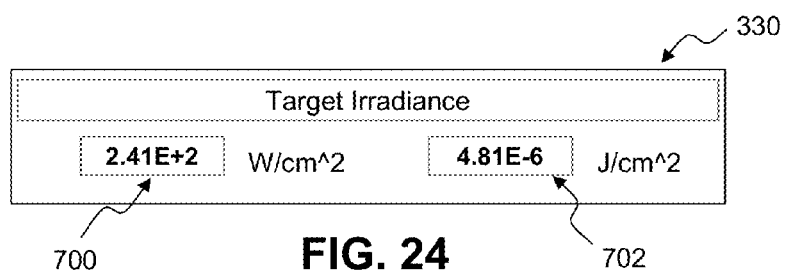
FIG. 24 is a representative view of an exemplary target irradiance output module of the graphical user interface of FIG. 4.

Referring to FIG. 24, an exemplary target irradiance output module 330 is shown. In the illustrated embodiment, target irradiance output module 330 provides information on the irradiance of target object 168. Target irradiance output module 330 displays in region 700 the radiant power impinging upon the target surface in Watts/cm². This corresponds to the value of variable 660 which is determined by laser targeting software 114 by dividing the value of target energy variable 662 by the value of pulse width variable 376. Target irradiance output module 330 displays in region 702 the radiant energy impinging upon the target surface in Joules/cm² which is determined by laser targeting software 114 as explained in connection with equation 11 above. The values reported for variables 660 and 662 may not be the total amount of energy within the entire laser spot at the target plane because they represent only the portions of the laser spot incident on the target 168.

Figure 25:
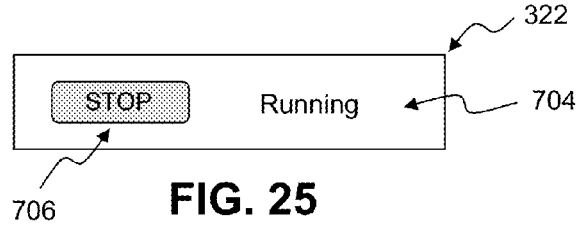
FIG. 25 is a representative view of an exemplary software control input module of the graphical user interface of FIG. 4.

Referring to FIG. 25, user interface 300 in a software control input module 322 provides information on the status of laser targeting software 114. When laser targeting software 114 is actively processing data the textual label "Running" is displayed in region 704 of software control input module 322. Laser targeting software 114, once started, continues to run until input 706 is selected. As laser targeting software 114 continues to run the number of samples considered in energy on target output module 334, as explained herein, increases.

Figure 26:
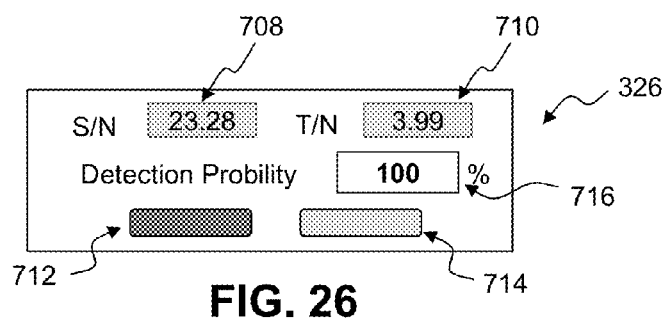
FIG. 26 is a representative view of an exemplary detection probability output module of the graphical user interface of FIG. 4.

Referring to FIG. 26, an exemplary detection probability output module 326 is shown. In the illustrated embodiment, detection probability output module 326 provides information on noise in the system and the probability of detection. Laser targeting software 114 determines a value of a signal to noise (S/N) variable 670 (see FIG. 22) and displays that value in region 708 of detection probability output module 326. In one embodiment, the value of S/N variable 670 is determined based on equation (13)

$$S/N = \left(\frac{A_t}{R^2 NEI}\right) fn_t e^{\frac{-2kR}{R^2}} \quad (13)$$

wherein $A_t$ is the projected area of the target; R is the Slant Range to Target; NEI is the Noise Equivalent Irradiance; f is the retro reflectance of target; $n_t$ is the efficiency factor for pulse stretching by the target; and k is the atmospheric extinction coefficient. Equation 13 involves the source, intervening medium, optical subsystem, detector, signal-conditioning optics, and display. The complete equation may be simplified based on assumptions or neglecting minimal contributions to the overall S/N resulting in equation 14

$$S/N = \frac{\phi_{eff}}{NEP} \quad (14)$$

wherein $\phi_{eff}$ is the part of the flux incident upon the sensor entrance aperture that is effective in evoking a response in the sensor and NEP is the level of flux incident upon the sensor entrance aperture that produces an average change in the output signal equal to the root-mean-square (rms) noise. In other words, it is a ratio of the peak signal to rms noise. It is this value that is displayed in region 708. If $\phi_{eff}$ and NEP are equal this gives a SNR of 1.

Laser targeting software 114 further determines a value of a threshold to noise (T/N) variable 672 and displays that value in region 710 of detection probability output module 326. Laser rangefinders generally detect the signal pulse by comparing the amplitude of the amplified and filtered signal with a threshold setting. The Threshold to Noise ratio (T/N) is the ratio of this electrical threshold to the total rms noise at the comparator. The value of T/N is set by the requirement to limit noise-induced false alarms. In one embodiment, the value of variable 672 may determined based on equation (15)

$$T/N \cong \sqrt{-2\ln(2\sqrt{3}\,(PW)(FAR))} \quad (15)$$

$$FAR = \frac{c}{2R_{max}} \quad (15a)$$

wherein $R_{max}$ is the maximum range of a range counter (value of range gate variable 426 in FIG. 9; default is 0.3 km); c is the speed of light; FAR is the average false alarm rate (in one example assumed to be 1/1000); and PW is the pulse width (value of variable input 376). In other words it is the ration of the detection threshold to rms noise.

Once the values for variable 670 and variable 672 are known, laser targeting software 114 is able to determine a value for a Detection Probability variable 674. The probability of ranging to a target object is generally the probability that the peak electrical signal plus noise will exceed a detection threshold and drive the output of the curve in FIG. 27 as well as all other output values. In one embodiment, laser targeting software 114 determines the value of detection probability variable 674 by equation (16)

$$Pd = \frac{1}{2} + \frac{1}{2}\text{erf}\left(\frac{S/N - T/N}{\sqrt{2}}\right) \quad (16)$$

wherein S/N is the value of variable 670; T/N is the value of variable 672; and erf(x) is a single sided error function. If the value of detection probability variable 674 is 100 percent then laser targeting software 114 illuminates green region 712 of detection probability output module 326 indicating a likelihood of detecting target object 168 with the detector. If the value of detection probability variable 674 is less than 100 percent then laser targeting software 114 illuminates red region 714 of detection probability output module 326 indicating an absence of a likelihood of detecting target object 168 with the detector. In either case, the value of detection probability variable 674 is displayed in region 716 of detection probability output module 326.

Figure 27:
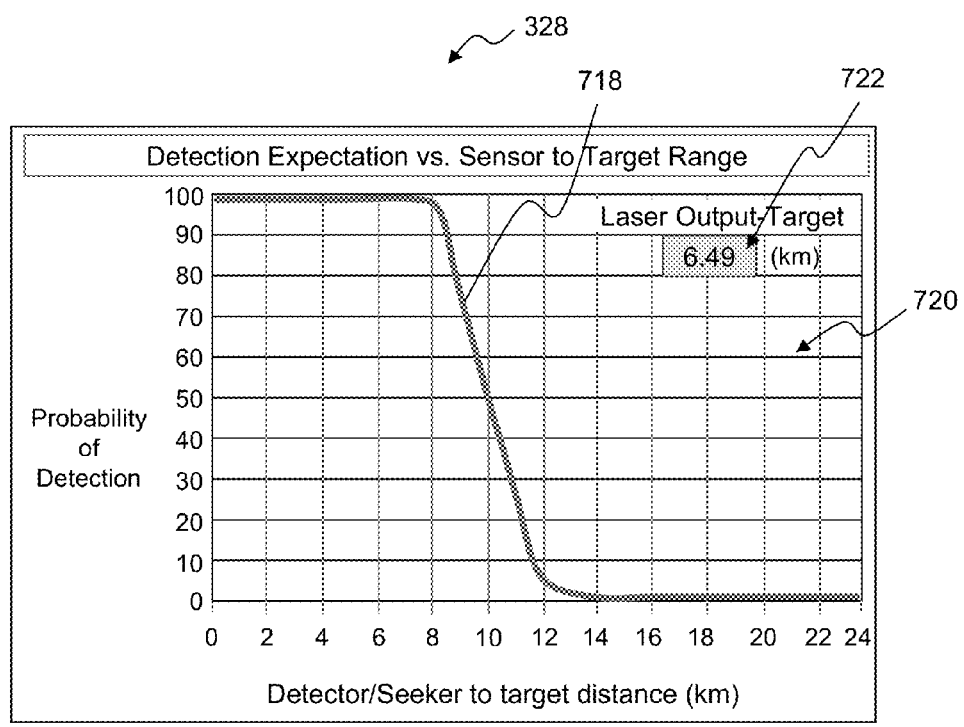
FIG. 27 is a representative view of an exemplary detection expectation over a range output module of the graphical user interface of FIG. 4.

The value of detection probability variable 674 is dependent on the value of detector range variable 621. Referring to FIG. 27, laser targeting software 114 determines the value of detection probability variable 674 at a variety of values of detector range variable 621. These values of detection probability variable 674 are stored in an array along with the corresponding values of the detector range variable. A visual representation 718 of the value of detection probability variable 674 for the various values of detector range variable 621 are shown in region 720 of the detection expectation over a range output module 328. Further, the user inputted value for detector range variable 621 is displayed in region 722 of detection expectation over a range output module 328. In one embodiment, the detection expectation over a range output module 328 graphs the Pulse Detection in Gaussian Noise function (equation 16) where the x axis is range from the Lambertian reflective target surface to the sensor input aperture and the y axis is the estimated probability of detection. Visual representation 718 provides an operator with a indication of how close the inputted range displayed in region 722 is from the range at which the value of variable 674 drops below 100 percent. The graph displayed in detection expectation over a range output module 328 is one example of a visual representation of the detection probability as a function of range to the target.

Figure 28:
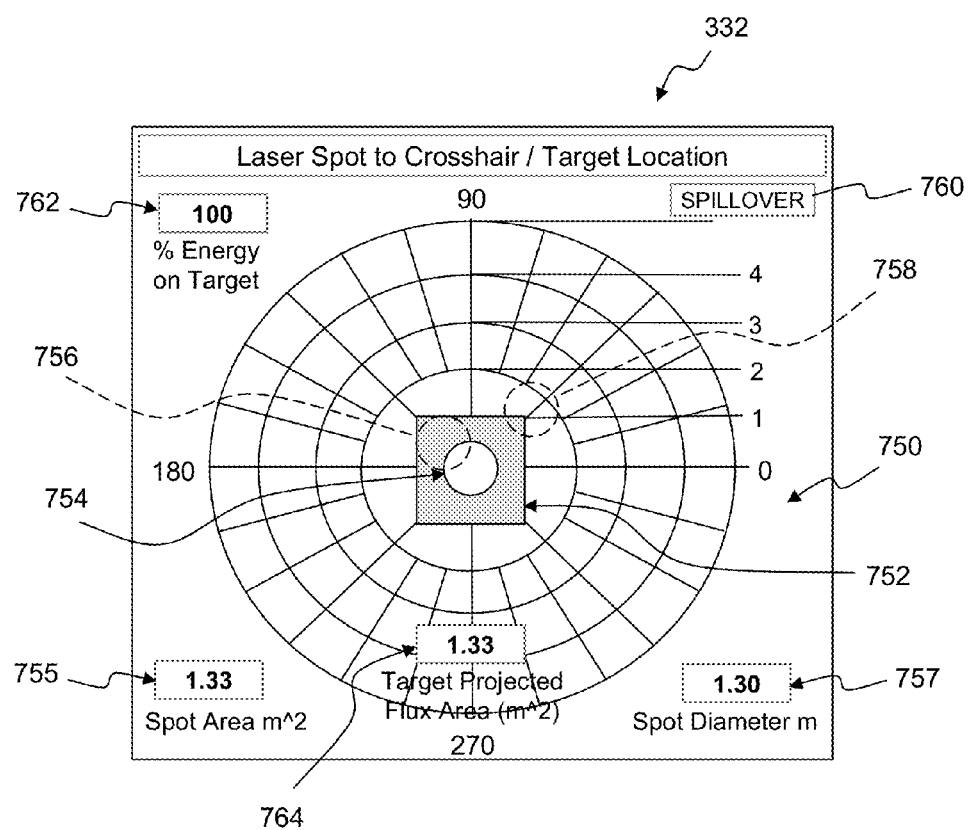
FIG. 28 is a representative view of an exemplary laser spot alignment output module of the graphical user interface of FIG. 4.

Referring to FIG. 28, an exemplary laser spot alignment output module 332 is shown. Laser spot alignment output module 332 includes a representation of a polar graph 750. A shaded area 752 is indicated on polar graph 750. Shaded area 752 corresponds to target object 168 as seen through a reticle of either detector 158 of laser rangefinder device 152 or detector 200 of tracking device 198. In the illustrated embodiment, shaded area 752 is centered on polar graph 750. Also, as illustrated shaded area 752 is a quadrilateral in shape. This shape corresponds to the values of width variable 474 and height variable 478 which were specified through target object input module 310 adjusted for the angle specified through target object input module 310. As such, adjusting the size of the target specified through target object input module 310 and/or adjusting the angle specified through target object input module 310 results in the size of shaded area 752 changing. Of course, the shape specified through target object input module 310 and the corresponding shape represented by shaded area 752 may be any desirable shape, including polygonal, circular, elliptical, and other suitable shapes.

A laser spot region 754 is further illustrated on polar graph 750. Laser spot region 754 corresponds to the size of the laser spot at the target. In the illustrated embodiment, laser spot region 754 is a circular region having a diameter corresponding to the value of a laser spot at target variable 680 (the value of the laser spot diameter at target variable 680 is provided in region 757 of laser spot alignment output module 332). The determined area of the laser spot is provided in region 755 of laser spot alignment output module 332 (value of a spot area variable 682). A Gaussian TEM00 transverse mode has been assumed in conjunction with all of the laser beam profile and directional characteristics given from the laser input parameters.

The location of laser spot region 754 is determined based on the provided laser input and directional characteristics. The laser spot centroid is determined based on the boresight error and/or the stabilization error which is independent of laser spot diameter. This angular error generates an error in the laser centroid at the target surface some distance from the output of the laser. A zero degree angular error places the laser centroid at the center of the crosshairs of FIG. 28 which are at the center of the target area in both x and y directions. The boresight error is assumed to be static while the stabilization error may cause the position of the laser centroid in FIG. 28 to move during execution of the software.

In FIG. 28, laser spot region 754 is shown completely aligned with shaded area 752. As such, 100 percent of the energy of the laser spot is incident on the target. A second laser spot region 756 is shown for comparison purposes. Second laser spot region 756 is not completely aligned with shaded area 752, but does still completely overlap shaded area 752. A third laser spot region 758 is also shown for comparison purposes. Third laser spot region 758, like second laser spot region 756 is not completely aligned with shaded area 752. Further, third laser spot region 758 only partially overlaps shaded area 752. This means some of the laser energy at the target plane is not impinging upon target object 168. When this is the case, laser targeting software 114 provides a "Spillover" indicator 760 on laser spot alignment output module 332 to alert the operator that a portion of the laser energy is not impinging on the target object 168.

Laser spot alignment output module 332 further provides additional characteristics regarding the laser spot at the target. In region 762, laser spot alignment output module 332 provides the value of a percentage of energy on target variable 678. The value of percentage of energy on target variable 678 is an estimate of the percentage of the amount of energy that is to be incident upon the target surface of the overall energy of the laser spot at the target based on the assumption that the laser beam has a Gaussian TEM00 transverse mode.

In region 764, laser spot alignment output module 332 provides the value of a target projected flux area variable 676. The value of target projected flux area variable 676 is an indication of the Areance[exitance] (flux/cm2) of the laser energy that is "projected" toward the receiving sensor aperture from the fractional amount of the flux impinging upon the target.

Figure 29:
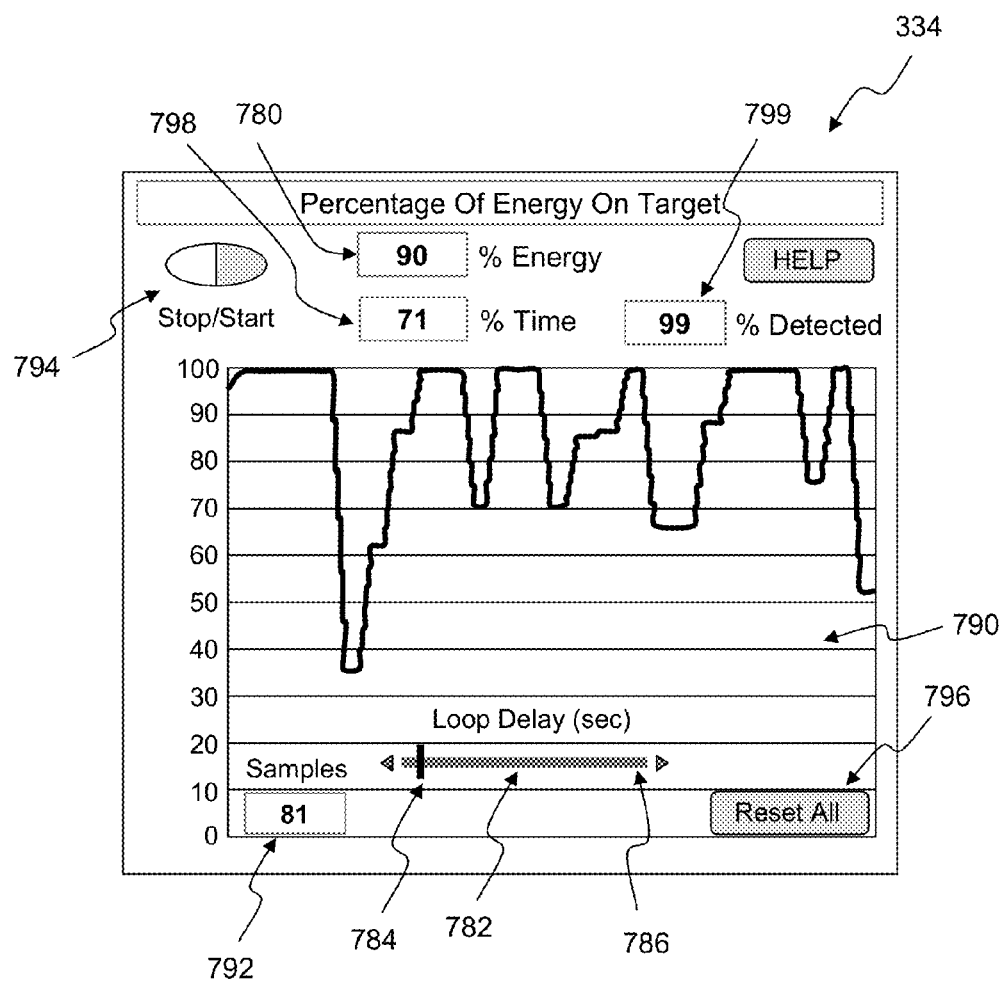
FIG. 29 is a representative view of an exemplary energy on target output module of the graphical user interface of FIG. 4.

Referring to FIG. 29, an exemplary energy on the target output module 334 is shown. Energy on target output module 334 provides a method of simulating how a particular pointing error may result in affecting the energy on a target surface. The combination of the Laser Beam Divergence Error (Beam Divergence is a characteristic of the laser which determines the beam diameter at some distance away from the laser output and is a variable in determining the amount of spillover due to spot size alone), Laser Beam to Sensor Reticle or Boresight Error (value of laser to reticle variables 602; see FIG. 17), Gimbal Stabilization Error (taken into account as part of the system jitter value), and Video Autotracker Error (taken into account as part of the system jitter value) combine to produce the total pointing error, which if large enough may cause the laser spot to be unintentionally misdirected away from the intended target object. The desired total pointing error is normally cited in a specification phrase something like "The laser designator shall be able to maintain 90% of the energy on a 3.4 meter×2.4 meter target 95% of the time at some range".

Energy on target output module 334 includes two inputs. First, input region 780 permits an operator to specify a value for a percent of energy on target variable 684 (see FIG. 22). The value of percentage of energy for detection variable 684 specifies the portion of the energy which is desired to remain on the target 168 over some number of samples or over some corresponding time frame. Second, a Loop Delay slide bar input 782 allows an operator to manipulate the sample rate for the model by selecting marker 784 and positioning the marker 784 relative to a bar 786.

For each sample, an error is determined. In one embodiment, each of the errors are modeled as random Gaussian events. The errors specified in pointing error input module 314 provided the limits on the error. Then based on errors the value for target variable 678 is determined for that sample as the ratio of the energy within the entire laser spot to the energy that is on the target surface. This value is compared to the value displayed in 650 in FIG. 21 to determine if the minimum amount of energy is illuminating the target 168 and more importantly that the amount of energy illuminating the target is reflected back through the atmosphere to satisfy FIG. 21 output 650. This is repeated for each subsequent sample.

Energy on target output module 334 includes several output indicators. Chart 790 expresses the value of percent energy on target variable 678 as a percentage of the samples that achieve the criteria to the total number of samples. The samples are the ordinate values and the percentage of energy are the abscissa values. As illustrated in FIG. 29, the range of samples shown have a percentage of energy in the range of from about 35 percent to a cap of 100 percent. The number of samples simulated (value of samples variable 693) is displayed in region 792 of the energy on target output module 334. The number of samples may be thought of as laser pulses whose resultant positioning at the target are modeled as random Gaussian events. If the value of the system jitter variable 604 is zero, then graph 790 is a straight line because there is no system jitter error component. The simulation may started and stopped through selection of input 794 or reset to zero samples through selection of input 796.

In addition to chart 790, energy on target output module 334 provides a percent of time (value of percent of time on target variable 686) that the desired percent of energy is present in region 798. The value of target variable 686 represents the fractional number of samples that provide the required amount of energy at the target surface. Further, energy on target output module 334 provides a percentage (value of percent detected variable 690) of the number of samples that the detector 158 of laser rangefinder device 152 or detector 200 of tracking device 198 is able to detect target object 168. The value of detected variable 690 represents the fractional number of samples that provide the required radiometric energy at the sensor aperture to satisfy the Pulse Detection in Gaussian Noise function (equation 16). The value of variable 690 is displayed in region 799.

Figure 30:
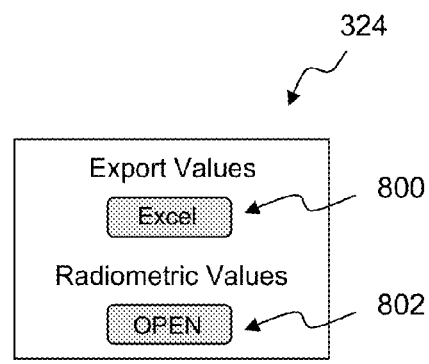
FIG. 30 is a representative view of an exemplary auxiliary output module of the graphical user interface of FIG. 4.

Referring to FIG. 30, an exemplary auxiliary output module 324 is shown. Auxiliary output module 324 allows an operator to select an export input 800 which causes laser targeting software 114 to output the values of various variables and the data for chart 718 in detection expectation over a range output module 328 and the chart 790 in energy on target output module 334. In one embodiment, the information is exported in a format acceptable by a spreadsheet program, such as a comma delimited format. An exemplary spreadsheet program is the EXCEL spreadsheet available from Microsoft Corporation located in Redmond, Wash. In one embodiment, the EXCEL spreadsheet is launched and the information is directly loaded into an EXCEL workbook.

Figure 31:
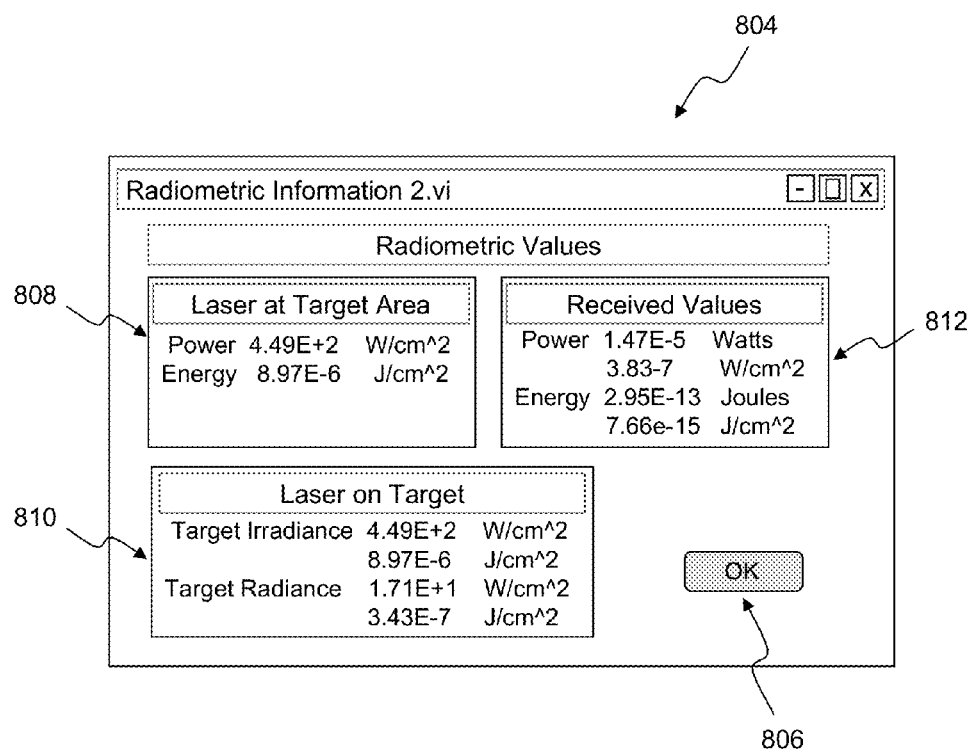
FIG. 31 is a representative view of an information window displayed in response to a selection of a radiometric values input of the exemplary auxiliary output module of FIG. 30.

Further, auxiliary output module 324 includes a Radiometric Values input 802. Selecting input 802 results in the information window 804 in FIG. 31 being displayed on display 130. Information window 804 may be closed by selecting input 806. A first region 808 of information window 804 provides the energy and power levels of the laser at the target area. A second region 810 of information window 804 provides information regarding the fractional amount of energy which impinges upon target object 168 and also on the amount of energy that target object 168 reflects. After the laser energy leaving the laser source irradiates the target surface, the target becomes a new diffuse source radiator for the detector sensor. A third region 812 of information window 804 provides information regarding the amount of energy that is received by the detector of the system.

Figure 32:
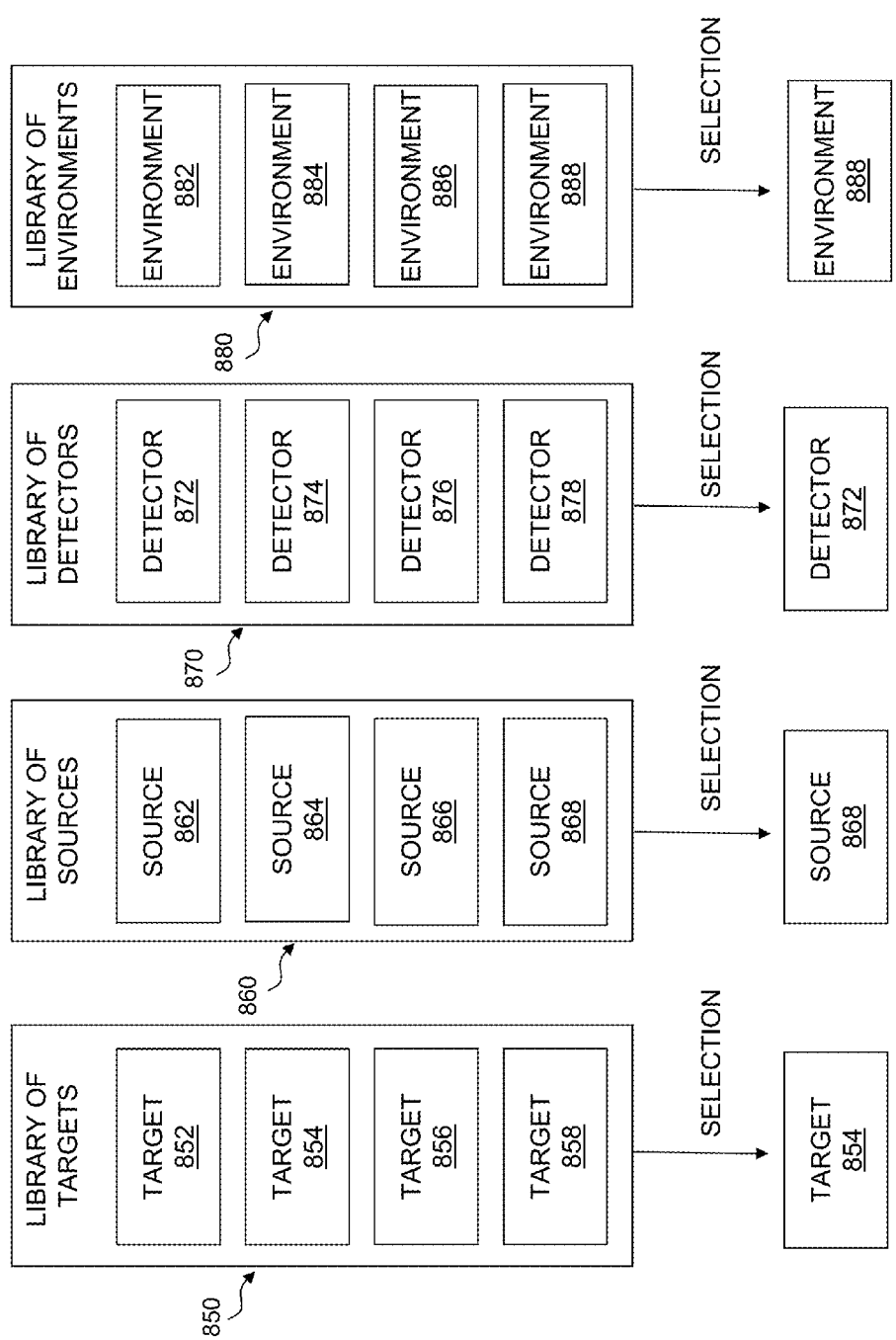
FIG. 32 a representative view of the information stored on a memory accessible by the computing system of FIG. 1 including a library of targets including information regarding a plurality of targets, a library of sources including information regarding a plurality of sources, a library of detectors including information regarding a plurality of detectors, and a library of environments including information regarding a plurality of environments.

Referring to FIG. 32, in one embodiment, memory 104 includes a library of targets 850 including information regarding a plurality of targets 852-858; a library of sources 860 including information regarding a plurality of sources 862-868; a library of detectors 870 including information regarding a plurality of detectors 872-878; and a library of environments 880 including information regarding a plurality of environments 882-888. The various library members provide the information regarding the respective sources, targets, environments, and detectors discussed herein for making a determination regarding a likelihood of detecting a given target object positioned in a given environment, illuminated by and given source, and potentially detected by a given detector. The use of one or more of libraries 850, 860, 870, and 880 are useful when planning a mission. Often times, a user of a laser rangefinder in a laser rangefinder application 150 or a user of a laser designator in a laser designator application 180 has some stock source systems and detector systems available for use in a mission wherein a given target is positioned in a given environment. Through libraries 850, 860, 870, and 880, the user is able to model a given source and a given detector to determine if they likely will be successful in detecting the given target is positioned in the given environment.

Figure 33:
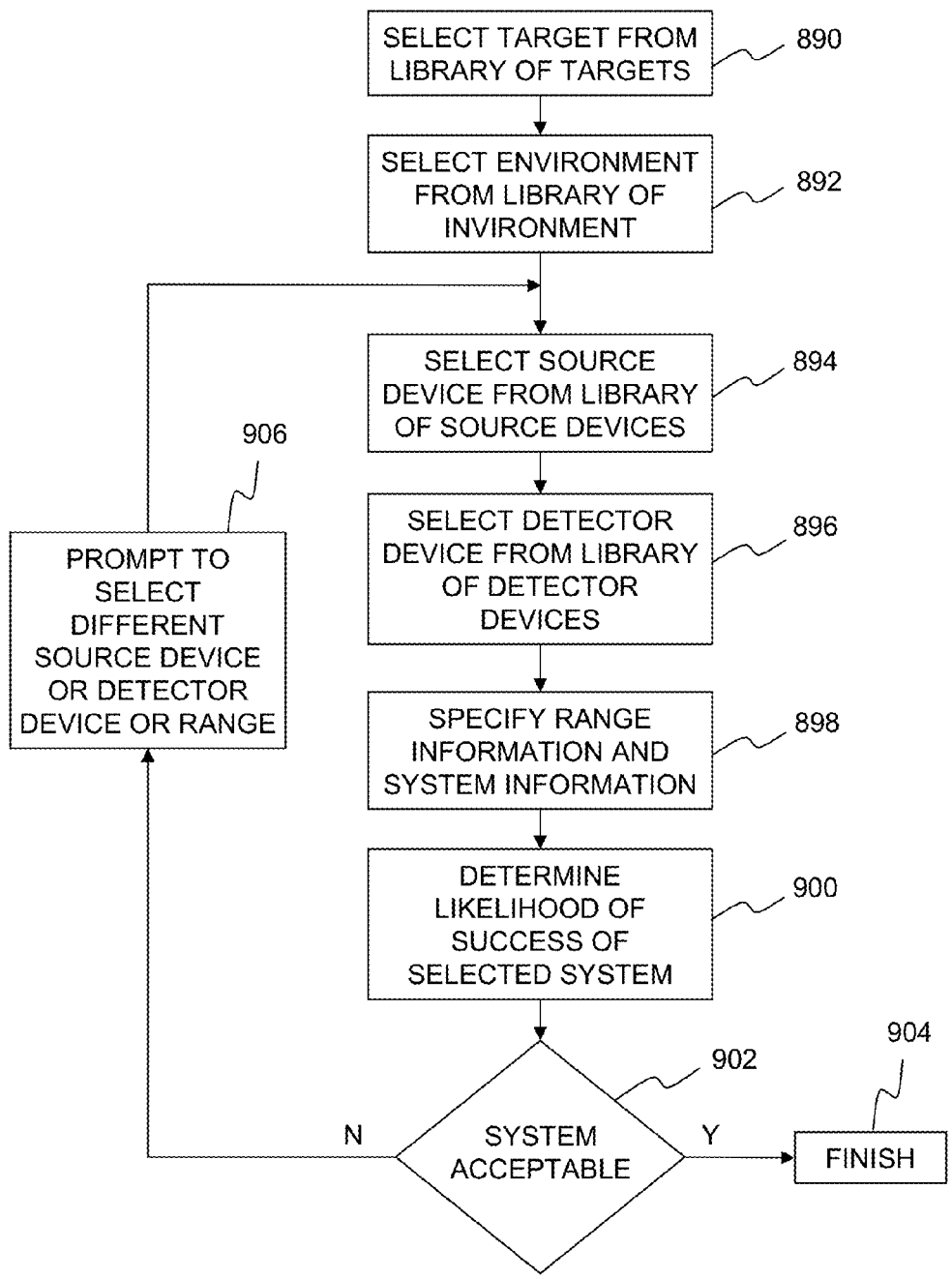
FIG. 33 illustrates an exemplary mission planning method.

Referring to FIG. 33, in an exemplary mission planning method a user selects a target, such as target 854, from the library of targets 850, as represented by block 890. A user also selects an environment, such as environment 888, from the library of environments 880, as represented by block 892. A user further selects a source, such as source 868, from the library of sources 860, as represented by block 894. A user also selects a detector, such as detector 872, from the library of detectors 870, as represented by block 896. The user also specifies range and system information as discussed herein, as represented by block 898. Laser targeting software 114 then determines a likelihood of success of the system, as represented by block 900. In one embodiment, if the value of detection probability variable 674 is 100 percent then the system is determined to be successful, as represented by block 902. If the system is successful, then laser targeting software 114 is finished, as presented by block 904. If the system is not successful, then the user is prompted to select a different source device or a different detector device, as represented by block 906. In one embodiment, the use may input variable values for a specific source, detector, or target instead of picking from a library. This may be needed in situations wherein the system does not include a library of detectors.

In one embodiment, if the value of detection probability variable 674 is 100 percent and there is no spillover then the system is determined to be successful. In one embodiment, if the value of detection probability variable 674 is 100 percent and the percentage of energy on the target exceeds the value of target variable 684 then the system is determined to be successful. In one embodiment, if the value of detection probability variable 674 is 100 percent, there is no spillover, and the percentage of energy on the target exceeds the value of target variable 684 then the system is determined to be successful.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A system for evaluating a target locator system, the system comprising:
   a display;
   at least one user input device;
   a controller operatively coupled to the display and the at least one input device;
   a memory accessible by the controller; and
      laser targeting software stored on the memory for execution by the controller, the laser targeting software including
         a graphical user interface presented on the display, the graphical user interface including:
         a first portion presenting at least one input for at least one source characteristic of a laser source;
         a second portion presenting at least one input for at least one detector characteristic of a detection system;
         a third portion presenting at least one input for at least one target characteristic of a target object; and
         a fourth portion presenting at least one input for at least one environment characteristic of an environment surrounding the target object; and
      processing sequences to determine a probability of detection of the target object illuminated by the laser source with the detection system over a plurality of ranges from the target object to the detection system, the probability of detection being based on the at least one source characteristic, the at least one detector characteristic, the at least one target characteristic, and the at least one environment characteristic.

2. The system of claim 1, wherein the graphical user interface further includes a visual representation of the probability of detection of the target object with the detection system over a plurality of ranges from the target object to the detection system.

3. The system of claim 2, wherein the visual representation is presented on the display along with the first portion, the second portion, the third portion, and the fourth portion.

4. A target locator system, the system comprising:
   a laser source;
   a power source operatively coupled to the laser source to power the laser source;
   a controller operatively coupled to the power source to control a power level of the laser source;
   a memory accessible by the controller; and
   laser targeting software stored on the memory for execution by the controller, the laser targeting software including
      a graphical user interface presented on the display, the graphical user interface including:
      a first portion presenting at least one input for at least one detector characteristic of a detection system;
      a second portion presenting at least one input for at least one target characteristic of a target object;
      a third portion presenting at least one input for at least one environment characteristic of an environment surrounding the target object; and
      a fourth portion presenting at least one input corresponding to a range relative to the target object; and
   processing sequences to determine a probability of detection of the target object illuminated by the laser source at a first power level with the detection system at a specified range input with the fourth portion, wherein the controller adjusts the power level of the laser source based on the probability of detection being below a threshold value.

5. The system of claim 4, wherein the threshold value is one hundred percent.

6. The system of claim 4, wherein the threshold value is less than one hundred percent.

7. The system of claim 4, wherein when the probability of detection is below the threshold value the controller raises the power level of the laser source to a second power level and determines the probability of detection of the target object illuminated by the laser source with the second power level.

8. The system of claim 4, wherein the controller limits the second power level to be lower than a threshold power level.

9. The system of claim 4, further comprising a display operatively coupled to the controller and at least one user input device operatively coupled to the controller and wherein the laser tracking software includes processing sequences to determine a probability of detection of the target object illuminated by the laser source at a first power level with the detection system over a plurality of ranges from the target object to the detection system, the plurality of ranges including at least one range lower than the specified range and at least one range higher than the specified range.

10. The system of claim 4, the probability of detection is based on the at least one source characteristic, the at least one detector characteristic, the at least one target characteristic, and the at least one environment characteristic.

* * * * *